INVENTOR
ROBERT W. RITZERT.
BY W. A. Sparks
ATTORNEY

Feb. 16, 1943. R. W. RITZERT 2,311,471
PRINTING INTERPRETER
Filed April 6, 1940 21 Sheets-Sheet 8

INVENTOR
ROBERT W. RITZERT
BY W. A. Sparks
ATTORNEY

Feb. 16, 1943.   R. W. RITZERT   2,311,471
PRINTING INTERPRETER
Filed April 6, 1940   21 Sheets-Sheet 9

INVENTOR
ROBERT W. RITZERT

BY *W. A. Sparks*
ATTORNEY

Feb. 16, 1943.    R. W. RITZERT    2,311,471
PRINTING INTERPRETER
Filed April 6, 1940    21 Sheets—Sheet 14

INVENTOR
ROBERT W. RITZERT
BY W. A. Spark
ATTORNEY

Feb. 16, 1943.　　　R. W. RITZERT　　　2,311,471
PRINTING INTERPRETER
Filed April 6, 1940　　　21 Sheets-Sheet 16

INVENTOR
ROBERT W. RITZERT
BY H. A. Spark
ATTORNEY

Feb. 16, 1943.  R. W. RITZERT  2,311,471
PRINTING INTERPRETER
Filed April 6, 1940  21 Sheets-Sheet 17
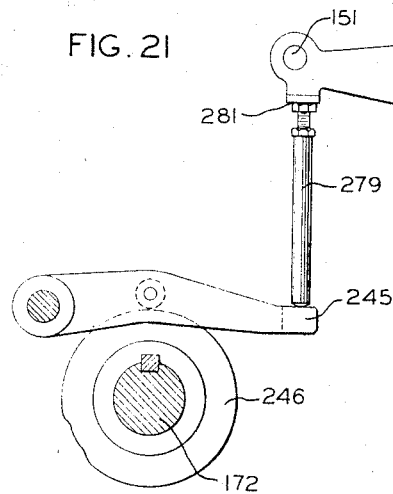
FIG. 21
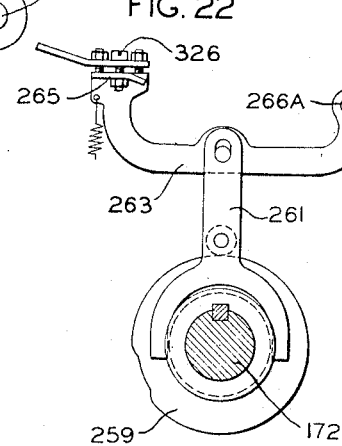
FIG. 22
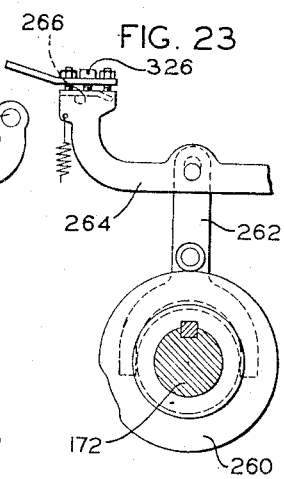
FIG. 23
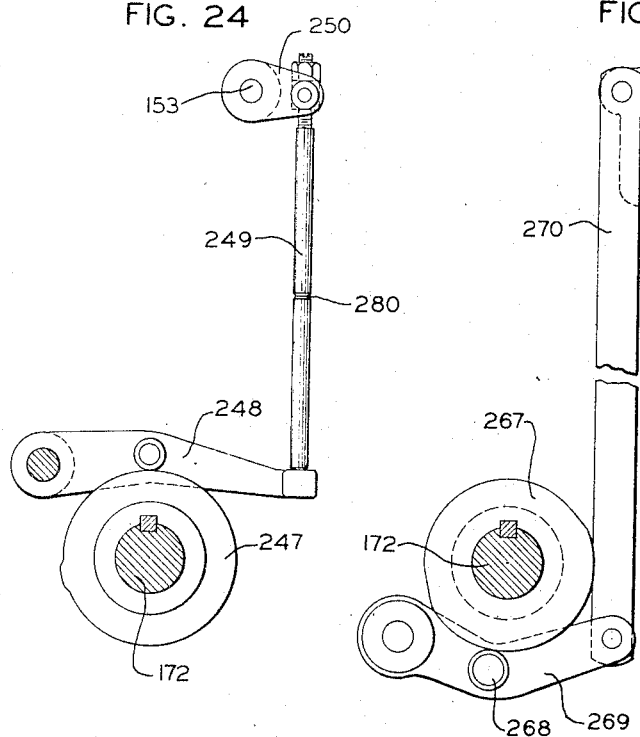
FIG. 24  FIG. 25
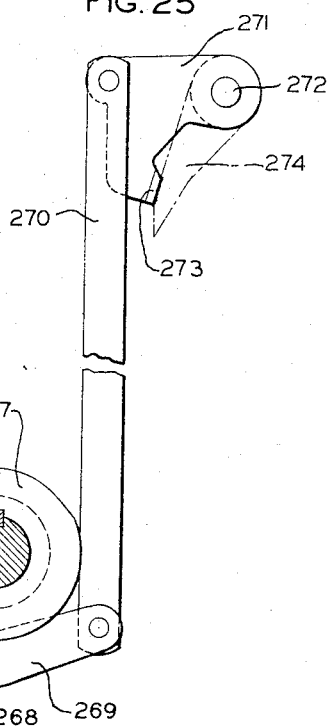
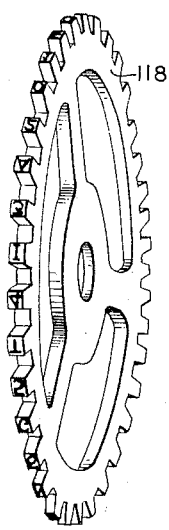
FIG. 32
INVENTOR
ROBERT W. RITZERT
BY *H. A. Sparks*
ATTORNEY Feb. 16, 1943.    R. W. RITZERT    2,311,471
PRINTING INTERPRETER
Filed April 6, 1940    21 Sheets—Sheet 18

INVENTOR
ROBERT W. RITZERT
BY W. A. Sparks
ATTORNEY

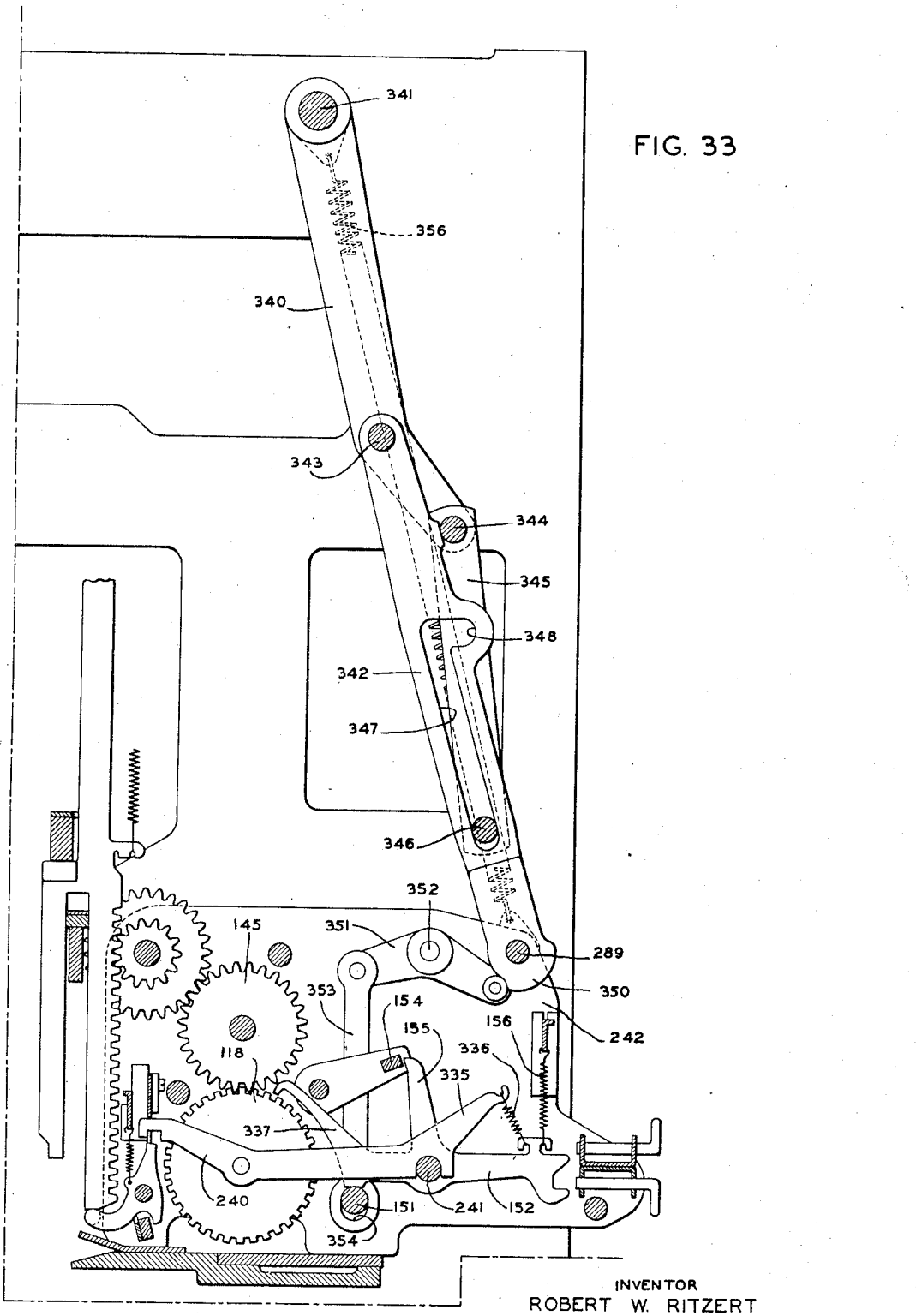

Patented Feb. 16, 1943

2,311,471

UNITED STATES PATENT OFFICE 2,311,471

PRINTING INTERPRETER

Robert W. Ritzert, Brooklyn, N. Y., assignor to Remington Rand Inc., Buffalo, N. Y., a corporation of Delaware Application April 6, 1940, Serial No. 328,337

5 Claims. (Cl. 101—96)

This invention relates to improvements in printing interpreters, and more particularly relates to machines which read the information contained in a punched data card, and then print this information on the same card.

Previous printing interpreters which were able to sense and print the ten digits when arranged in two rows or the alphabet when arranged in a single row on a card are described in U. S. Patent No. 1,668,916, issued to W. W. Lasker May 8, 1928, and No. 2,034,104 also issued to Lasker, on March 17, 1936. The present invention uses a code of punched data wherein all the digits and a full alphabet may be coded when arranged in two rows, resulting in the well known ninety column Powers data card.

The present invention resides in the provision of a base section which comprises a sensing head and the power driven cam units, a decoding section where the punched card code is translated to units representing the thirty-six characters, and a printing section where the card is printed with the characters sensed.

One of the objects of the invention is the provision of a printing interpreter capable of printing forty-five characters on a punched data card in conformity with the data sensed in any predetermined forty-five columns of coded designations.

Another object of the invention is to provide a structure which will permit the printing of sensed data in any one of seven horizontal positions on the data card.

Another object of the invention is to provide a structure which will permit the operator to shift from the sensing of an upper zone of a ninety column card to the sensing of the lower zone by moving a single lever.

Still another object of the invention is to provide a decoding unit having six permutation bars per data row capable of translating any of the thirty-six coded indicia into printable representations.

Another object of the invention is to provide a method of disabling any or all the printing units to prevent certain data from being transferred from coded to printed characters.

Another object of the invention is to provide a hinged printing unit which may be easily and conveniently rotated away from the rest of the machine to permit cleaning of the type wheels and replacement of the printing ribbon.

Another object of the invention is to provide a ratchet wheel on each printing unit and, cooperating therewith, an aligning pawl which insures the correct positioning of all the printing units and also removes the pressure of contact from the decoding selector units.

Other objects and structural details of the invention will be apparent from the following description when read in connection with the accompanying drawings, wherein Fig. 1 is an isometric view of the complete machine enclosed in its cabinet;

Fig. 3 is a continuation of Fig. 2 and should be used in conjunction with it;

Figure 4:
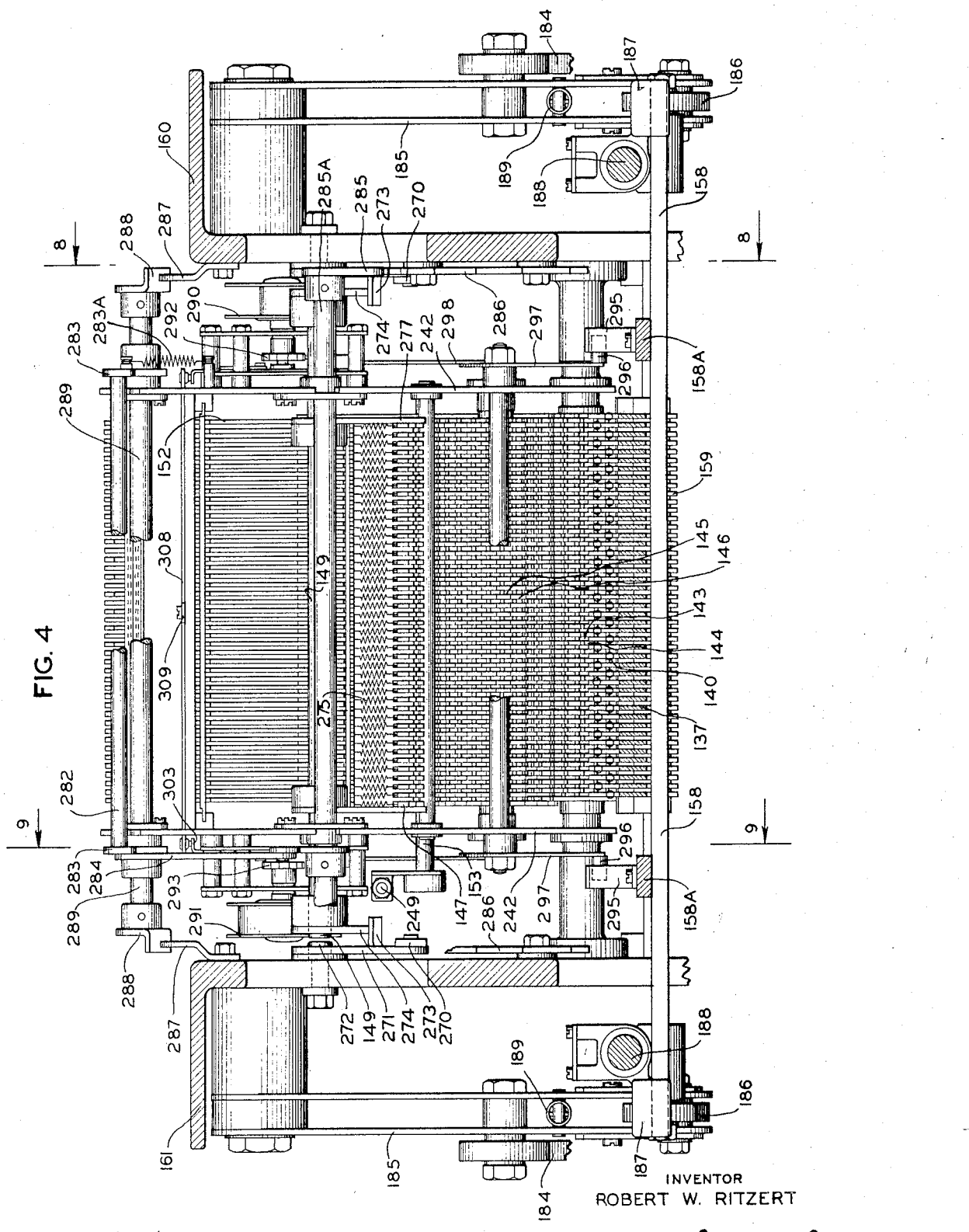
Fig. 4 is a plan view of the top of the machine showing the decoding rack bars and the printing mechanism.
Figure 5:
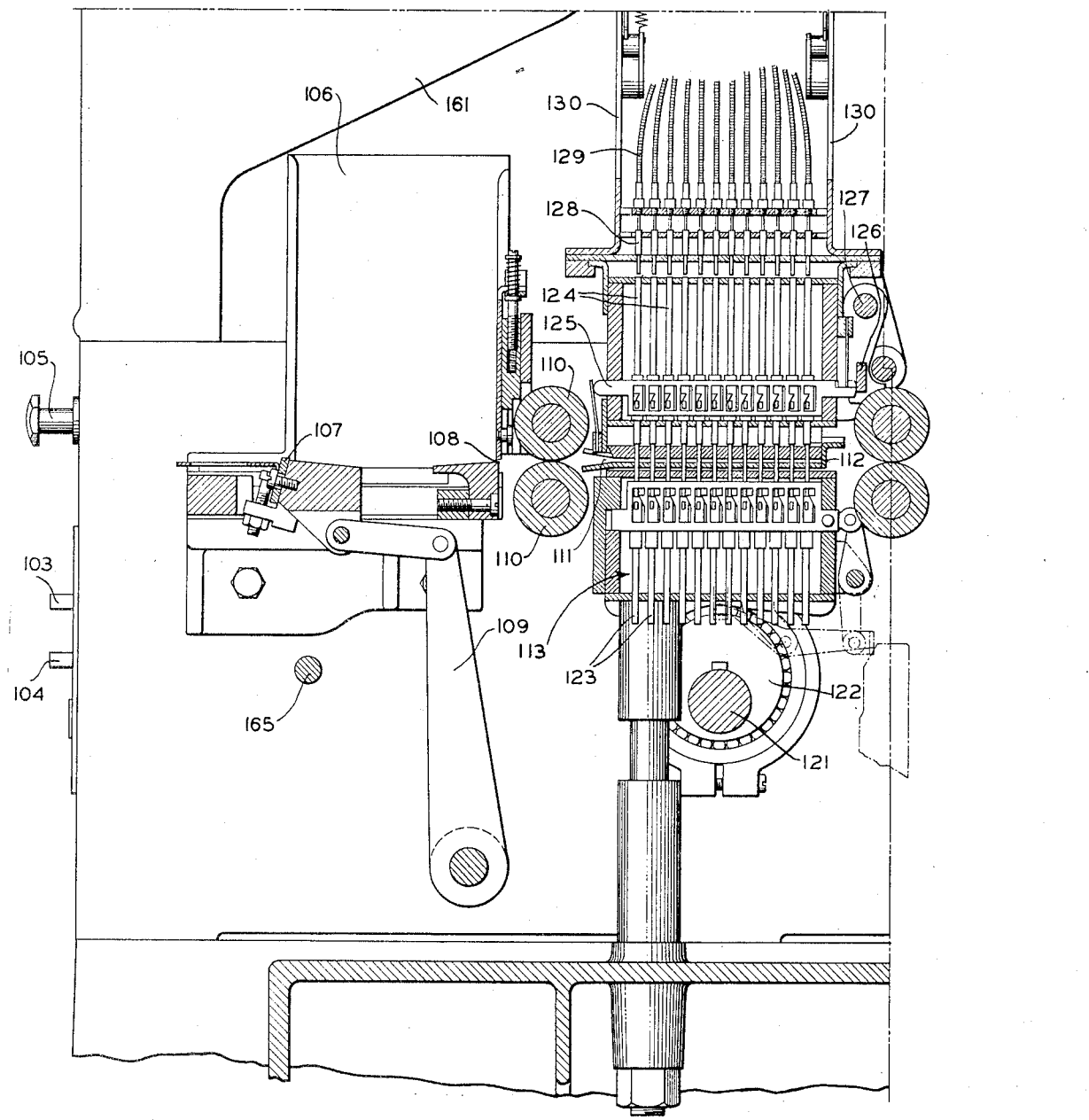
Fig. 5 is a cross sectional view taken through the center of the machine showing the sensing mechanism and the retaining pins.
Figure 6:
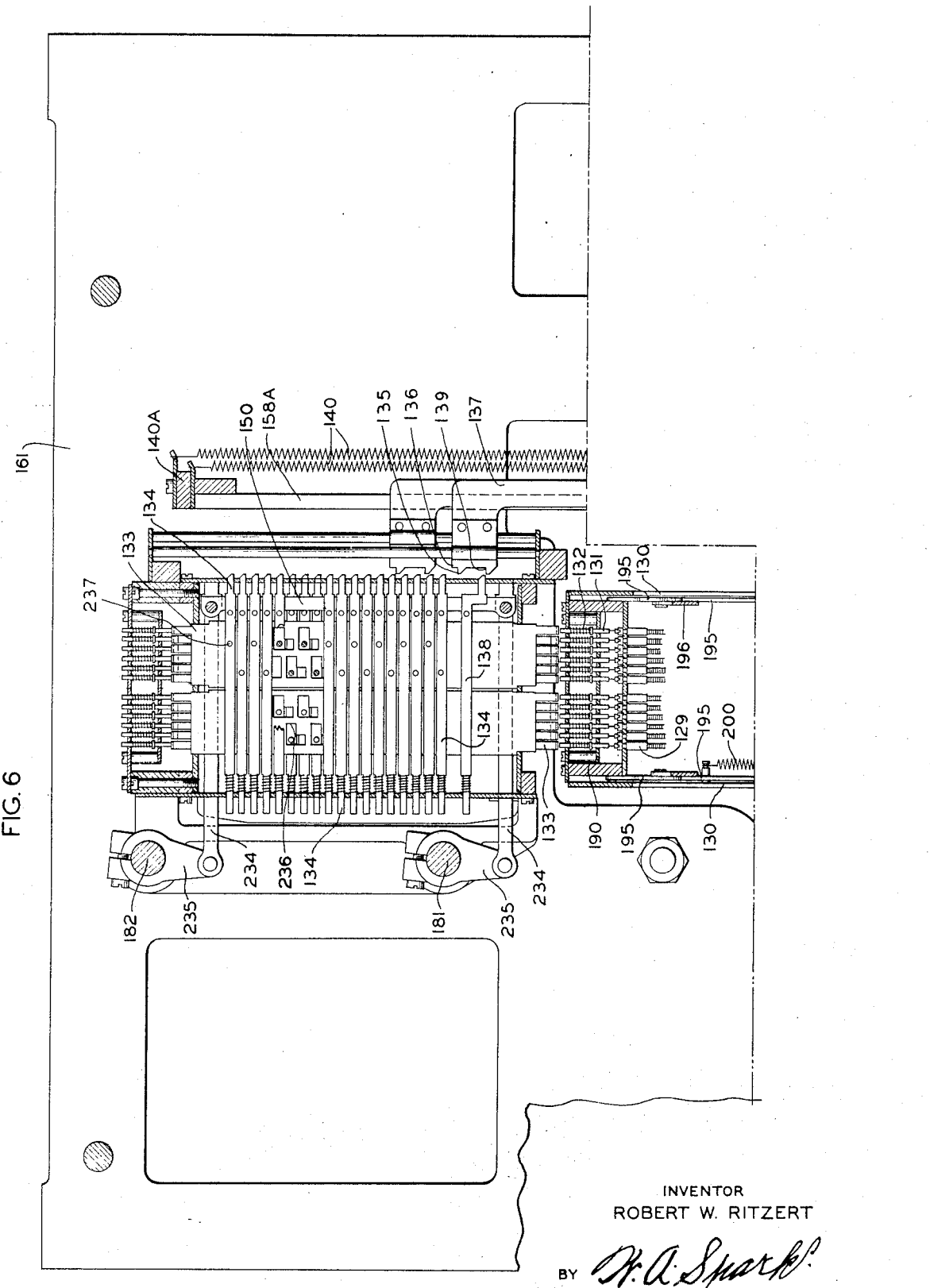
Fig. 6 is a cross sectional view taken through the center of the machine showing the decoding mechanism.
Figure 7:
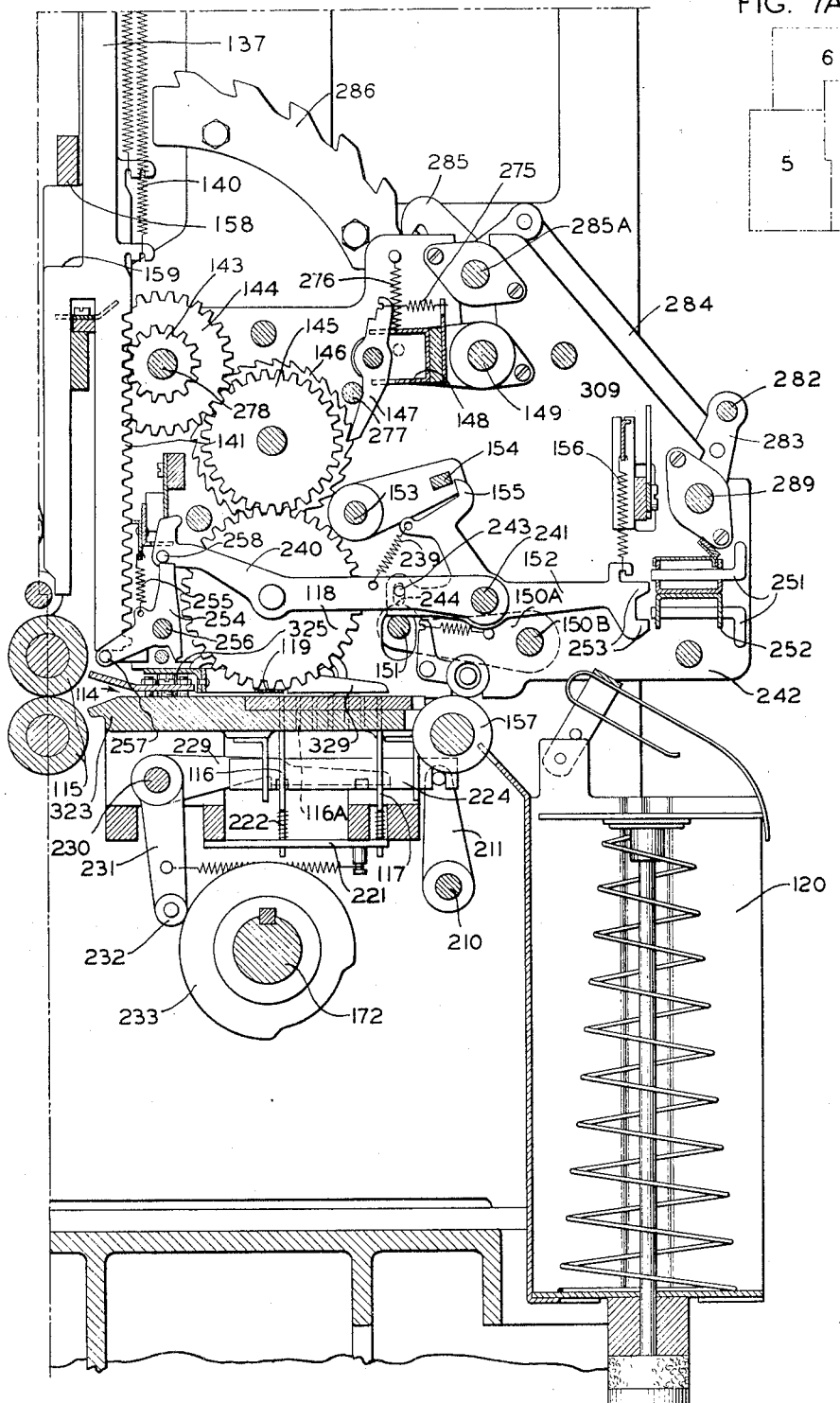
Fig. 7 is a cross sectional view taken through the center of the machine showing the printing mechanism.
Figure 8:
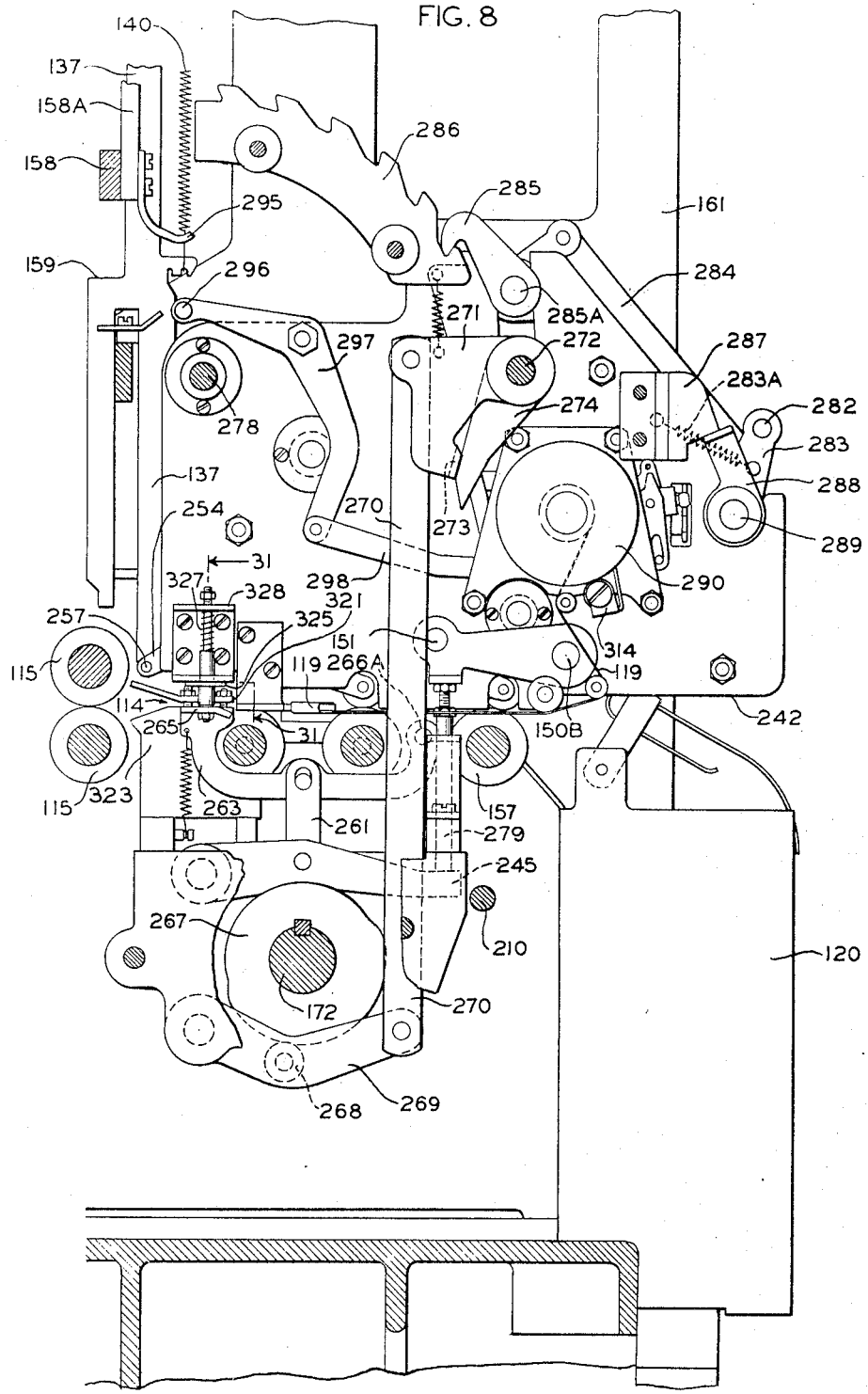
Figure 9:
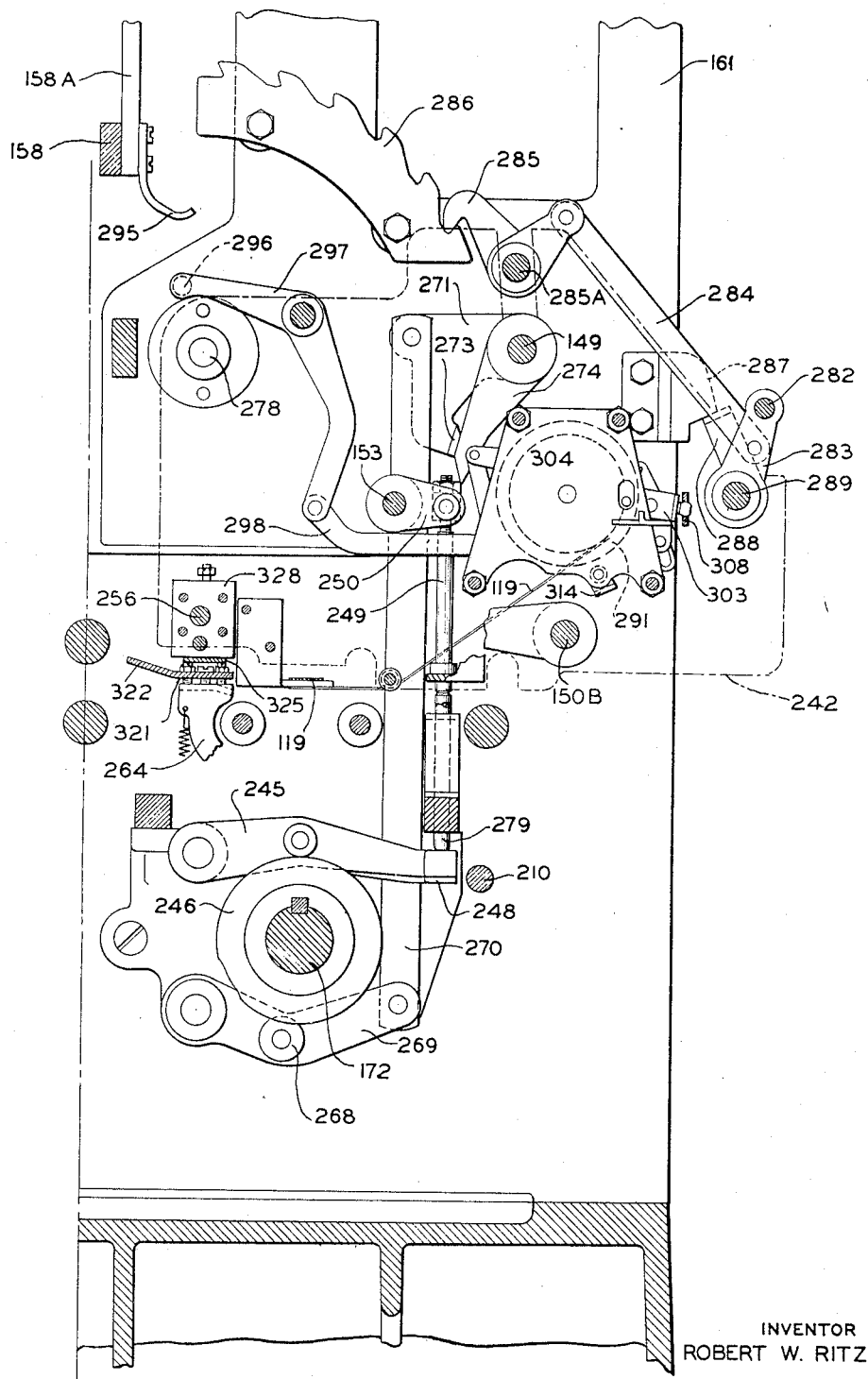
Figure 10:
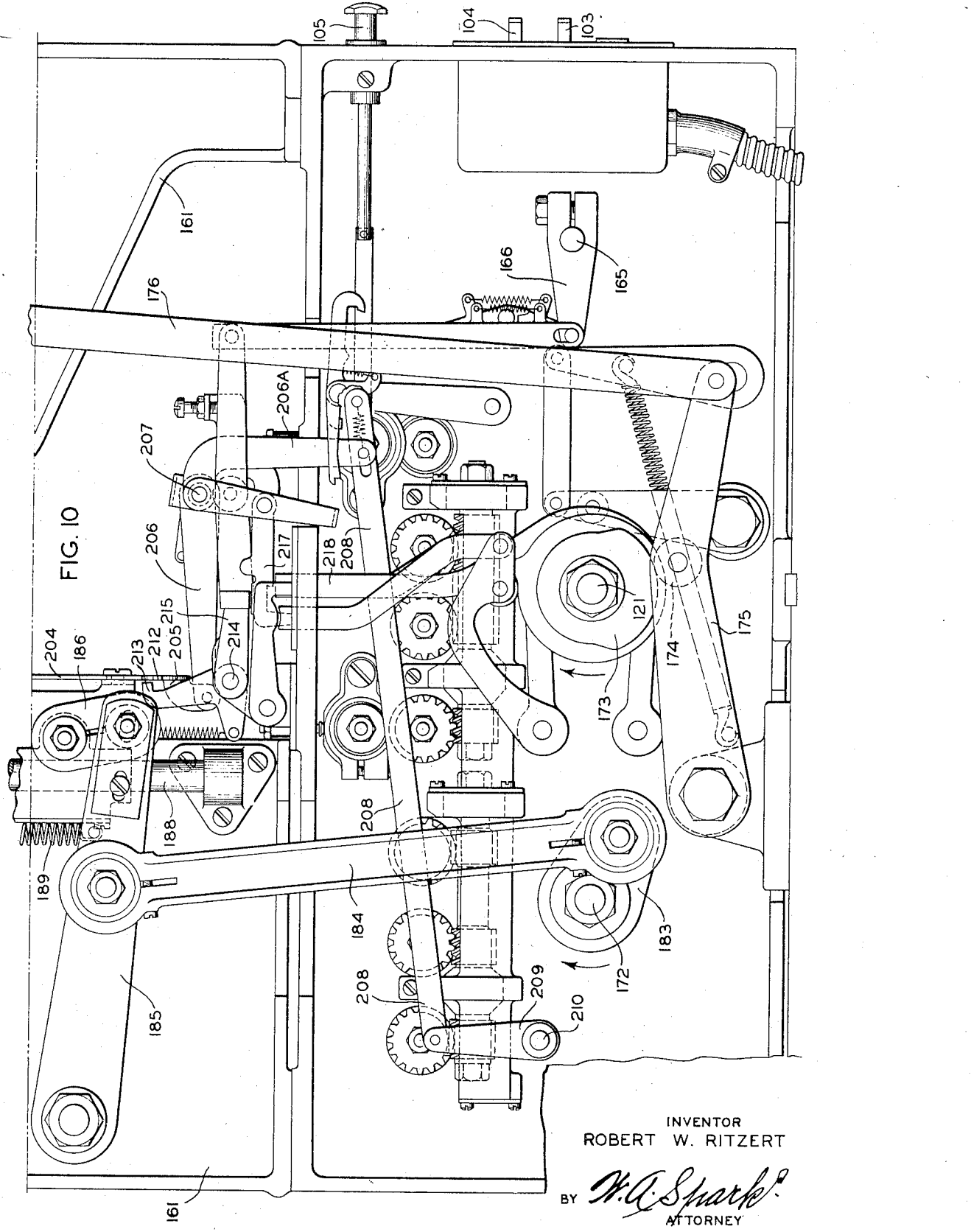
Figure 11:
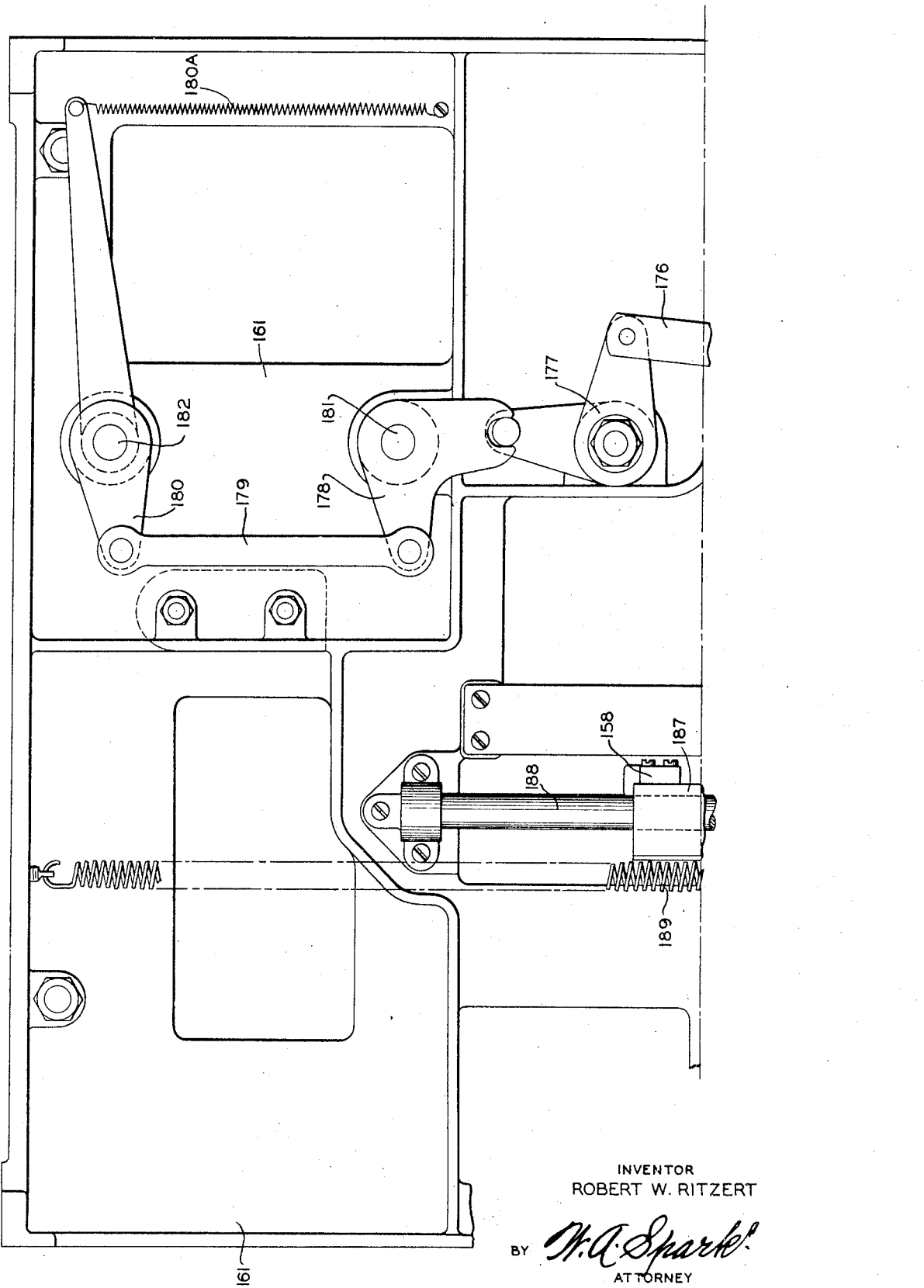
Figure 12:
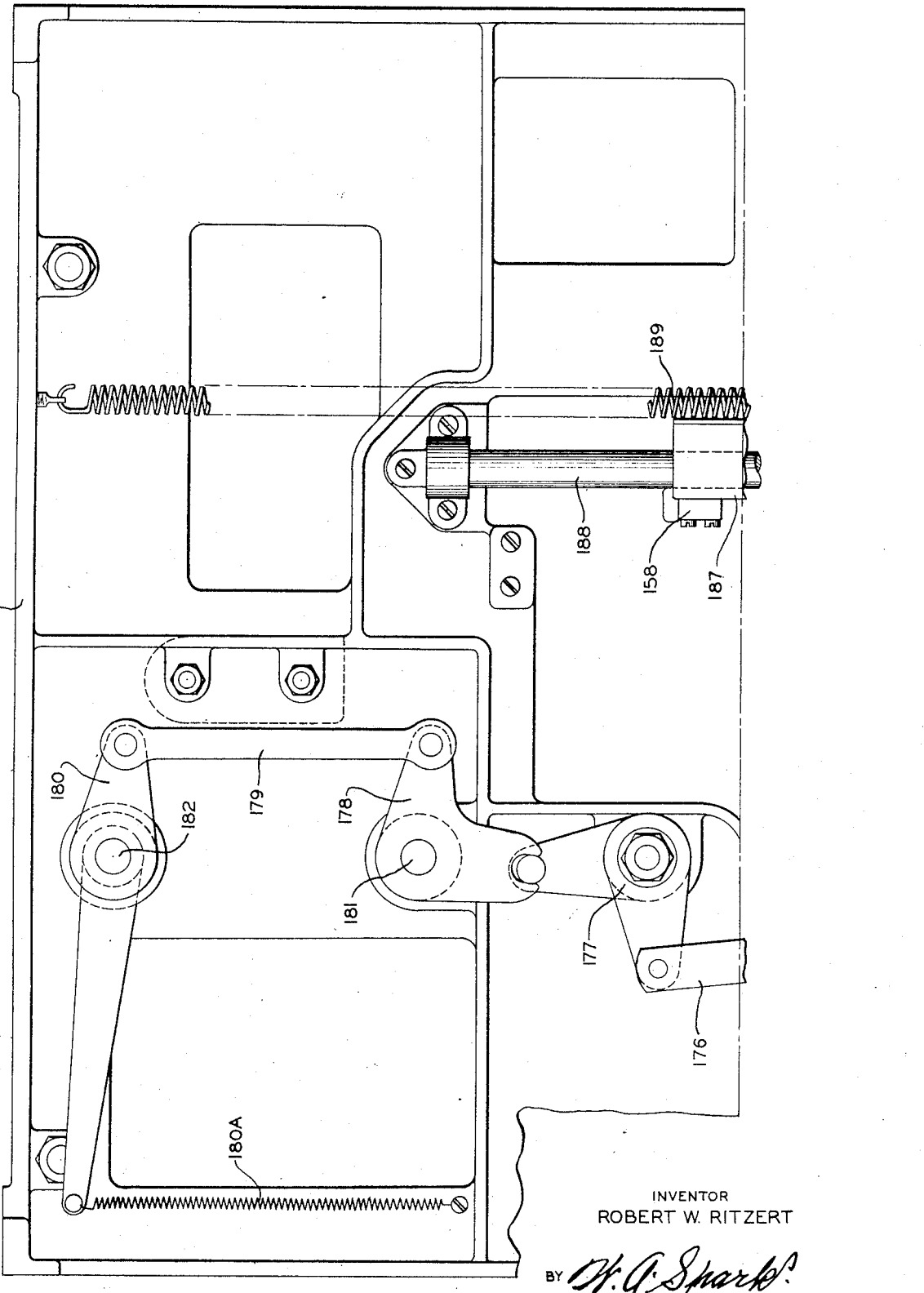
Figure 13:
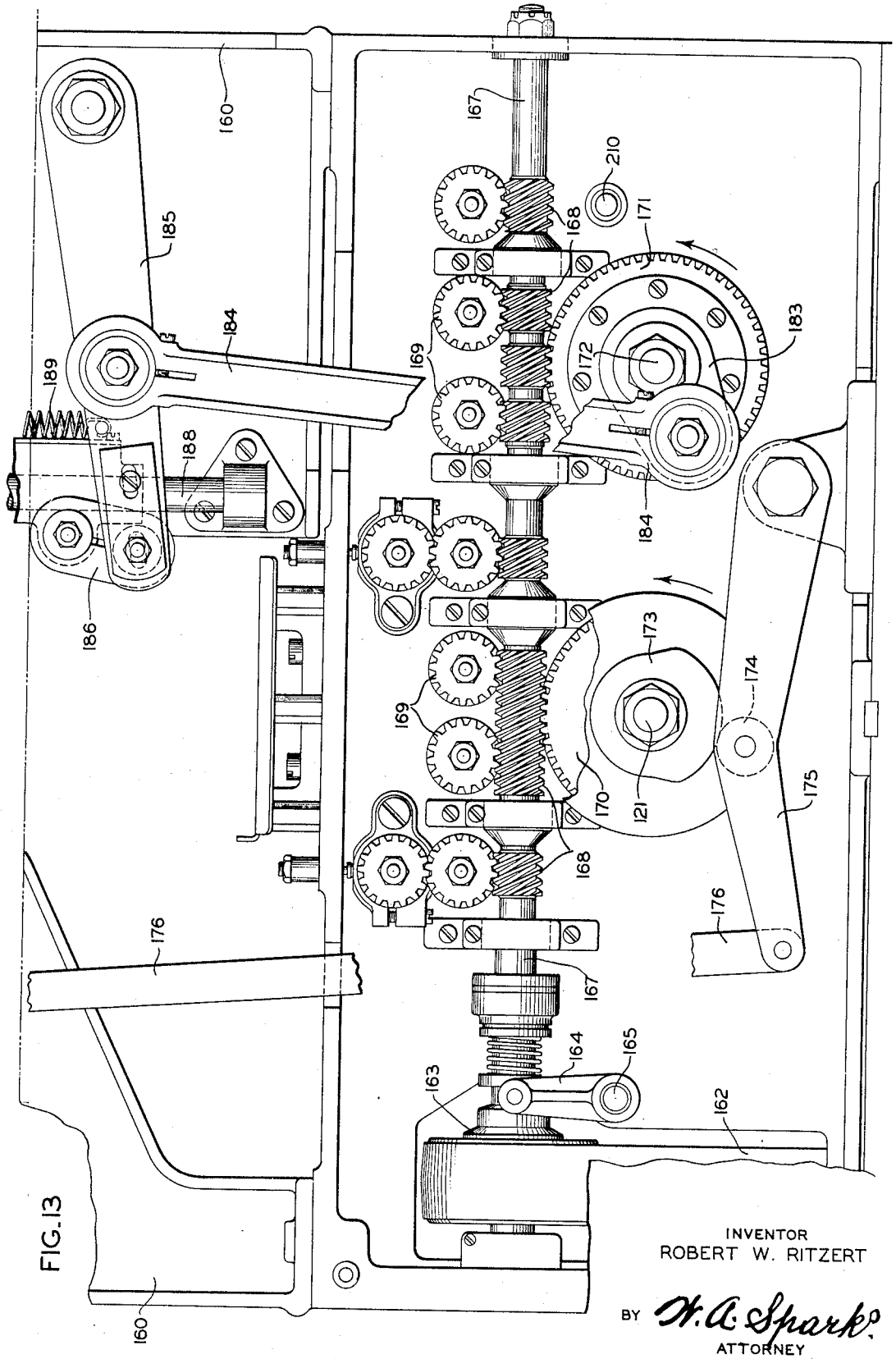
Figures 14, 15:
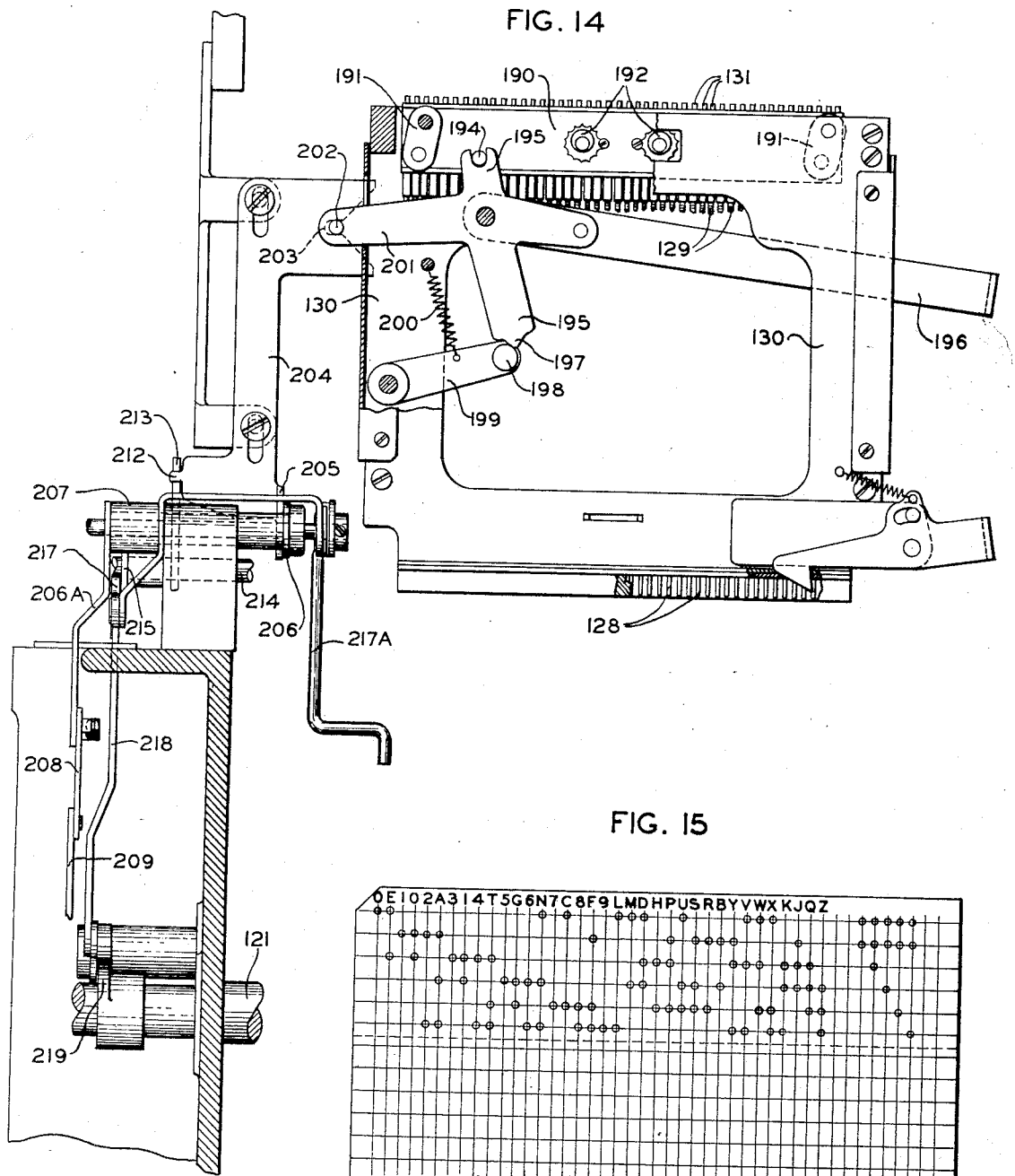
Figure 16:
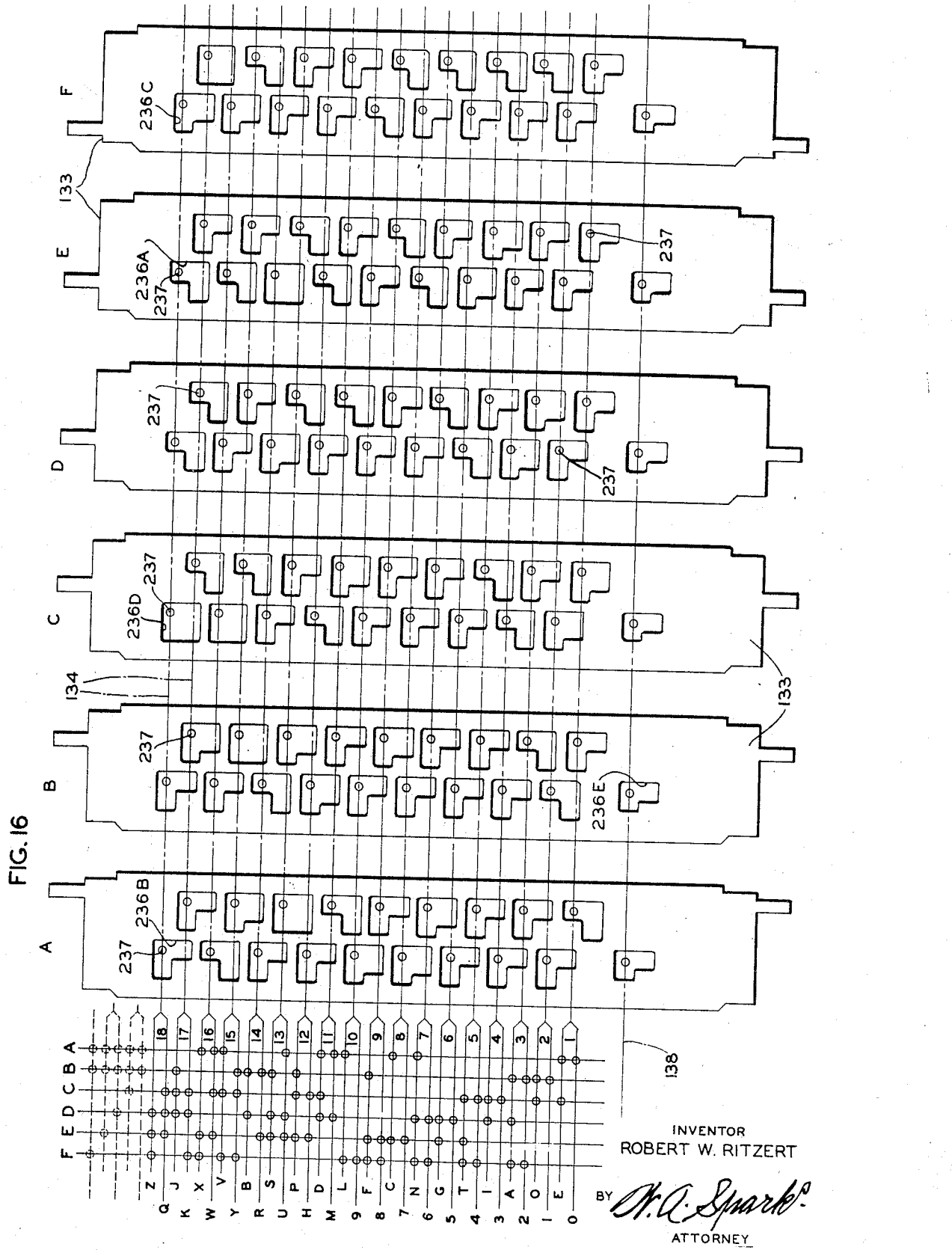
Figure 17:
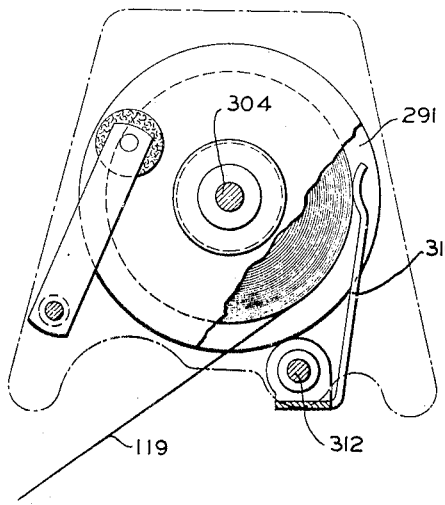
Figure 18:
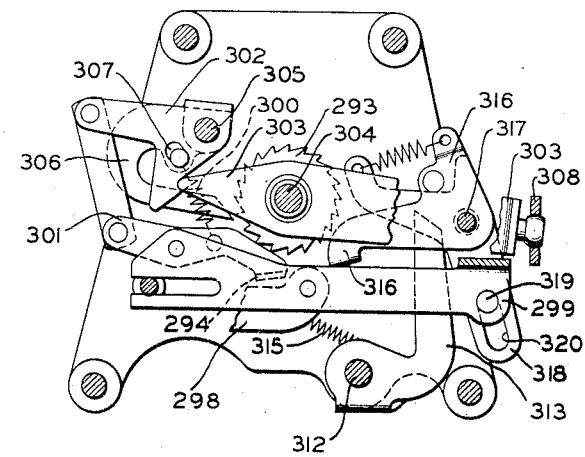
Figure 19:
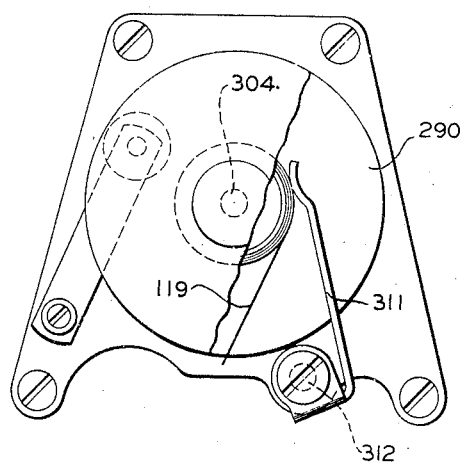
Figure 20:
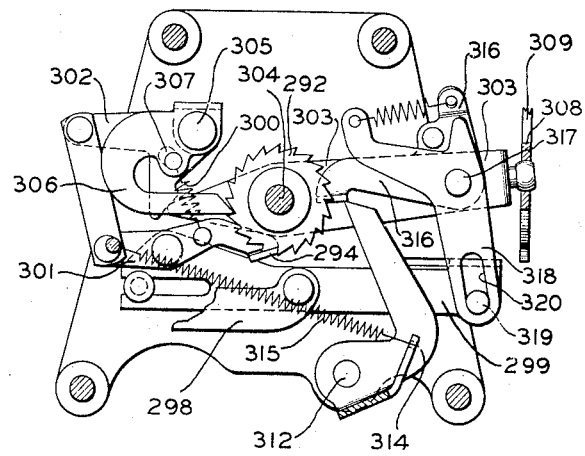
Figure 31:
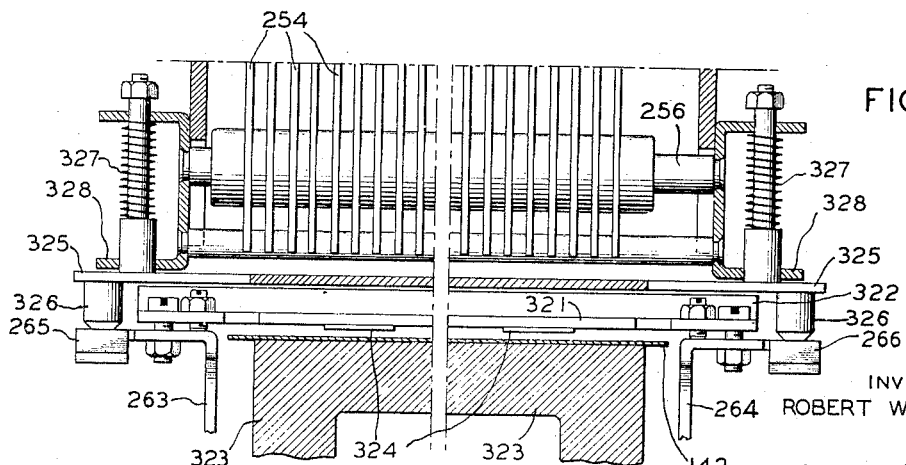
Figure 26:
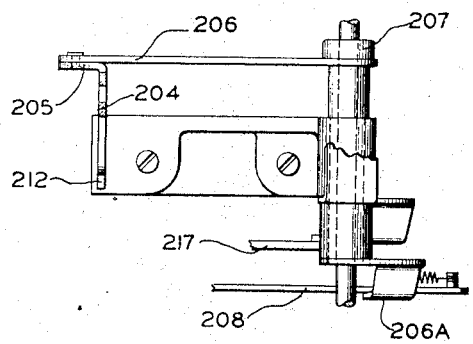
Figure 27:
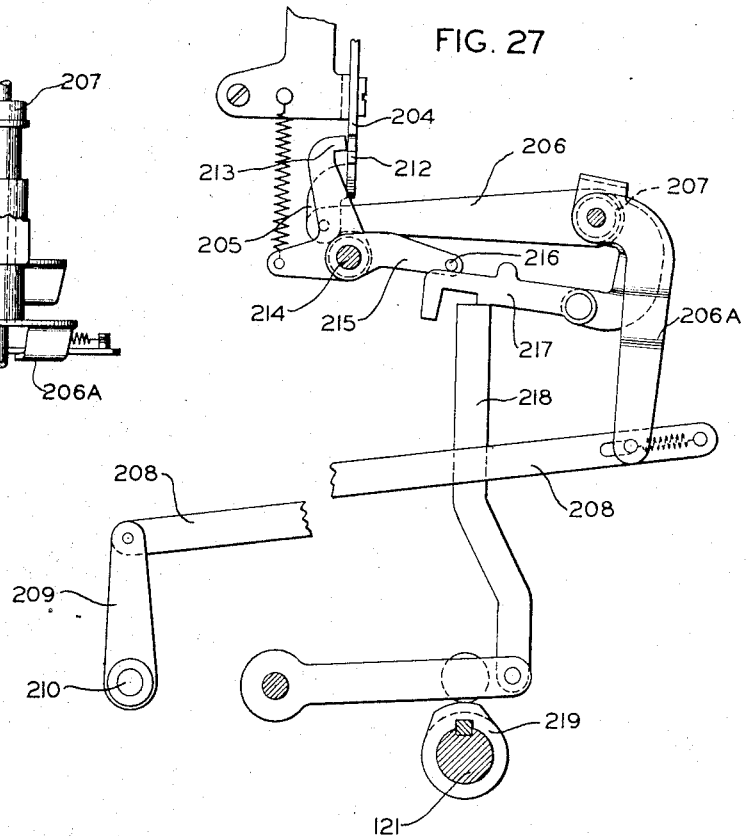
Figure 28:
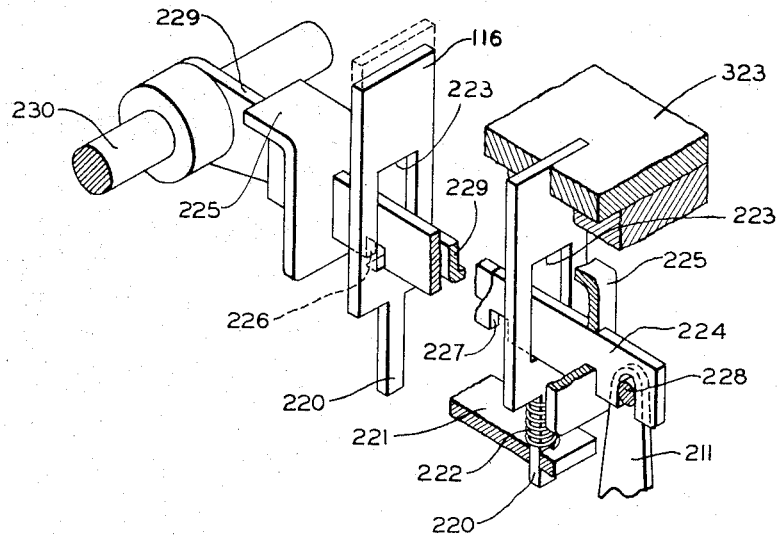
Figure 29:
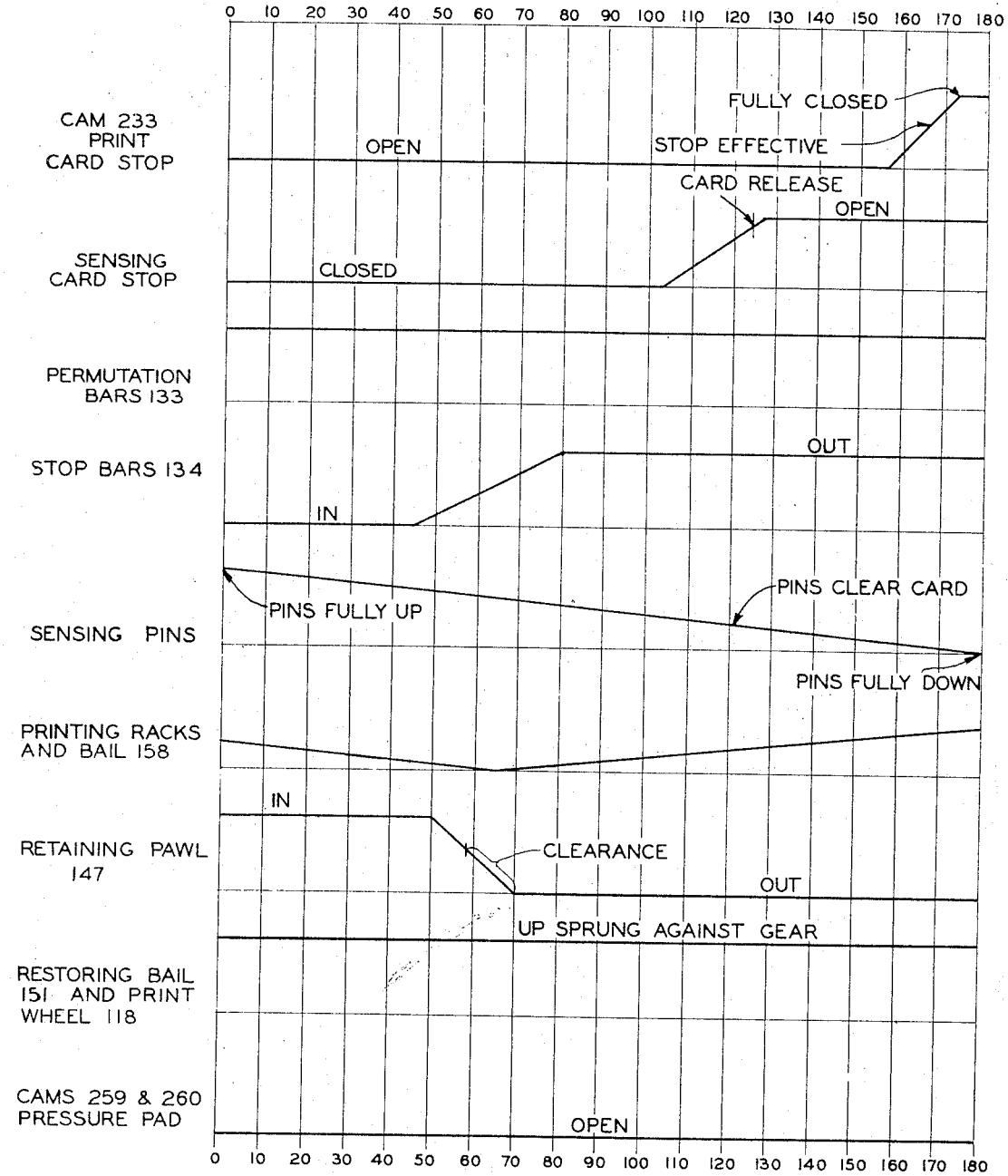
Figure 30:
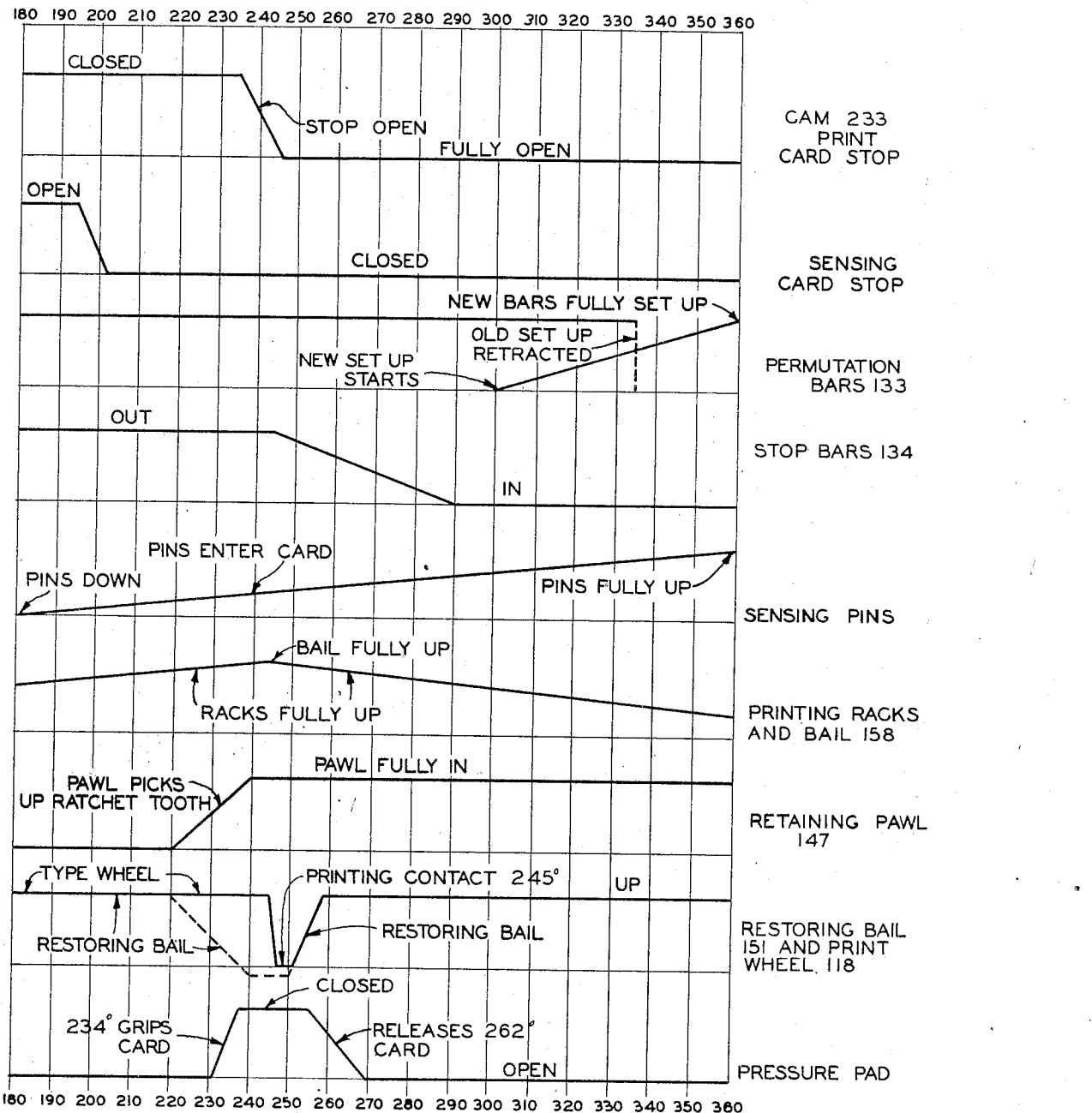

Fig. 7A indicates how Figs. 5, 6, and 7 may be combined to form a complete cross sectional view of the operating mechanisms;

Fig. 8 is a cross sectional view of the printing mechanism, taken along line 8—8 of Fig. 4 and showing the ribbon mechanism and many of the operating cams;

Fig. 9 is a cross sectional view of the printing mechanism taken along line 9—9 of Fig. 4 showing additional ribbon mechanisms and operating cams;

Figs. 10 and 11 when combined form an elevational view of the left side of the machine with the covers removed;

Figs. 12 and 13 when combined form an elevational view of the right side of the machine with the covers removed;

Fig. 14 is a front elevational view of the translator unit with some parts in section showing the method of shifting the upper and lower interponents and changing the card stops;

Fig. 15 is a face view of the data card;

Fig. 16 is a plan view of the six permutation bars used in the decoding unit, together with an explanatory chart;

Fig. 17 is a side view of one of the ribbon spools;

Fig. 18 is a side view showing the ratchet mechanism for winding the ribbon from one spool to the other with some parts in section;

Fig. 19 is an elevational view of one of the ribbon spools;

Fig. 20 is similar to Fig. 18 but indicates another operating phase;

Fig. 21 is a side view of the print restoring bail cam;

Fig. 22 is a side view of the right-hand printing pressure pad and cam;

Fig. 23 is a side view of the left-hand printing pressure pad and cam;

Fig. 24 is a side view of the firing bail cam and link;

Fig. 25 is a side view of the retaining pawl in its operating mechanism;

Fig. 26 is a plan view of part of the translator lock mechanism and printing card stop control;

Fig. 27 is a side view of a portion of the start-stop mechanism which shows the operation of the translator lock and the card stop transfer;

Fig. 28 is an isometric view of the card stops and their selective operating mechanism;

Figs. 29 and 30 when placed side by side form a composite timing diagram which indicates the phase of operation of the important cams and operating devices;

Fig. 31 is a cross sectional view of the printing pressure pad mechanism and is taken along line 31—31 of Fig. 8;

Fig. 32 is a detail view of a type wheel; and

Fig. 33 is a detail view of a modified mechanism for raising the printing mechanism.

GENERAL OPERATION OF THE MACHINE

Figure 1:
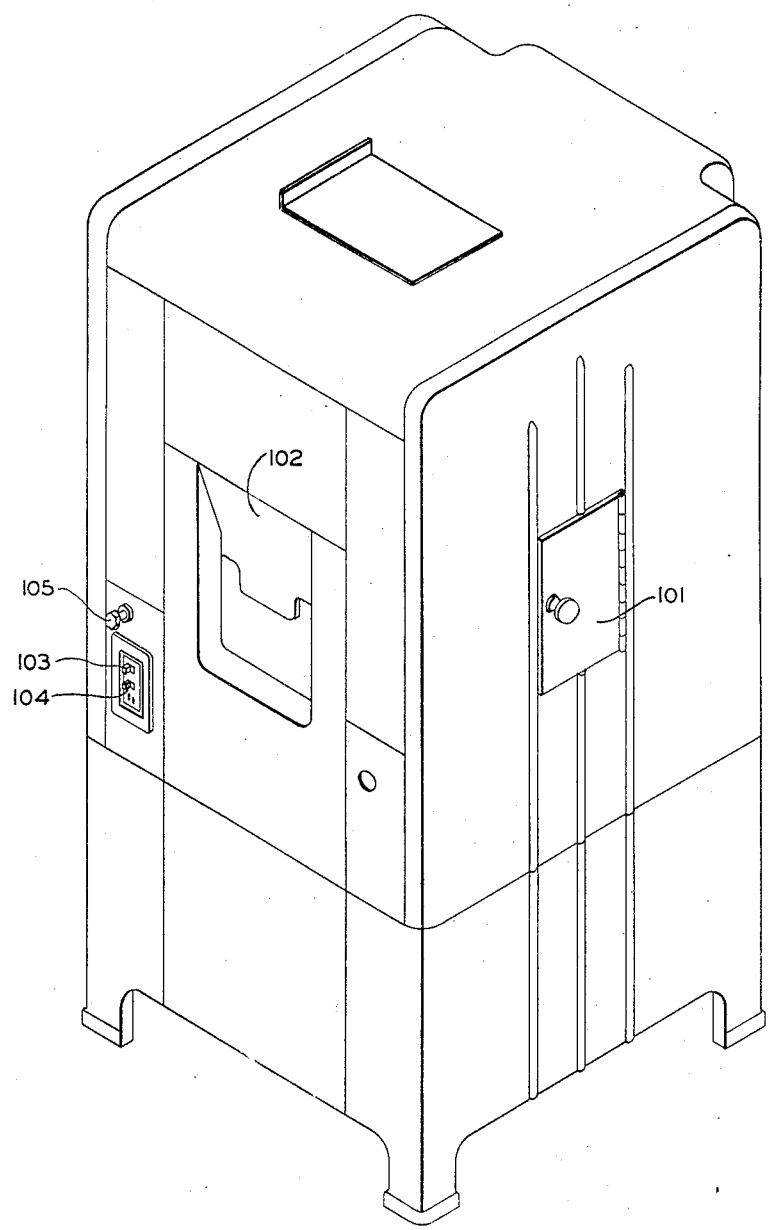

The complete machine as shown in Fig. 1 may be divided into four parts; the base section which serves as a supporting means and houses the motor; the sensing section, Fig. 5, which analyzes the card; the decoding section (Fig. 6) which renders the analysis useful and the printing section (Figs. 7, 8, and 9) which impresses the visual characters on the card.

The assembled machine is protected by covers which enclose nearly all of the operating parts. A door 101 (Fig. 1) is provided on the right-hand side for convenient changing of translators. At the front of the machine, a square opening 102 is provided for inserting the cards to be printed. Two switches are provided, one 103 for controlling the motor, and the other 104 for controlling lamps for illumination of certain internal parts. A starting button 105 completes the external controls.

Punched data cards are inserted in a magazine 106 (Fig. 5) and are fed from the bottom of the stack by a picker knife 107, through a throat 108, actuated by means of a card feeding lever 109 which reciprocates once for each machine cycle.

Card rolls 110 grasp the card and move it into a sensing chamber 111 where it is momentarily stopped by card stop 112 and sensed by a sensing mechanism 113. The stop 112 is then withdrawn and the card passes into the printing chamber 114 (Fig. 7) actuated by card rolls 115 and is stopped by one of the card stops 116 or 117. In this position the printing is effected by vertical movement of a plurality of type wheels 118 acting on a typewriter ribbon 119. As soon as the printing wheels have been retracted, the card is again released and it is carried to an eject pocket 120 by rolls 157.

The machine is designed to print characters on the ninety column card which has two data zones, each having forty-five character positions. There are only forty-five print wheels for printing one line for each machine cycle, hence it is necessary to put the cards through the machine twice, each time printing half the data punched therein.

The sensing mechanism is similar to the sensing head of the tabulator described in Patent 2,044,119, issued June 16, 1936, to W. W. Lasker. After the card is in the sensing chamber 111, the rotation of the main shaft 121 elevates the sensing mechanism 113 by means of an eccentric 122. Sensing pins 123 which find holes in the data card move upwardly to engage retaining pins 124, and elevate them until they are latched by the latch plate 125. The sensing head moves down soon after the retaining pins have been latched up as may be seen by reference to the timing diagram in Figs. 29 and 30. The retaining pins, however, remain in their latched position until after the decoding mechanism has translated the coded data into a form which can be used by the printing mechanism. As soon as the type wheels have been positioned, the latch plates 125 are disengaged by a bail 126, actuated by a shaft 127.

The upper ends of retaining pins 124 engage a set of pins 128 which are fastened to Bowden wires 129. There are five hundred and forty wires, one for each hole position in the data card, and they are assembled in a frame 130 usually called a translator (Figs. 5 and 6). The translator frame is removable from the machine so that other translators with a different arrangement of wires may be inserted for special work, as will be described later.

At the bottom of the translator the Bowden wires are positioned over their corresponding card hole positions, but at the top, the wires from the upper and lower zones are placed in alternate positions with one-half the spacing of the decoding units. This will be explained under the heading "Upper-lower transfer."

Placed directly above the top of each Bowden wire is an interponent pin 131, the central part of which is surrounded by a helical spring 132 which urges the pin downwardly and repositions the Bowden wire after it has been actuated and released.

Above the interponents is positioned a standard thirty-six character decoding unit similar to the standard decoding unit used on Powers tabulators, and described in application of Lasker et al., S. N. 174,534, filed November 13, 1937. This unit will be described in detail hereinafter under the heading "Code interpretation." As various combinations of permutation bars 133 are raised by pins 131, one of the decoding stop bars 134 will be released to move toward the rear (right, Fig. 6) of the machine. The distance the bars move also depends upon the number of permutation bars actuated; under certain conditions the bar will move only far enough to engage shoulder 135, while other combinations allow the bar to move twice as far and engage the shoulder 136. In this manner, each stop bar controls the printing of two characters and for a total of ten numerals and twenty-six letters, only eighteen stop bars are necessary.

The shoulders 135 and 136 are formed in guide members secured to the top portion of a rack bar 137 of which there are forty-five, which are resiliently urged upwardly by springs 140. The upper ends of springs 140 are attached to a cross bar 140A which is reciprocated vertically by means of rods 158A attached to a bail bar 158 (Fig. 7). The forty-five rack bars and forty-five cooperating springs are each positioned by an assembly of code bars as shown in Fig. 6.

At the lower extremity of rack bar 137 there is a rack 141 composed of twenty-two teeth (Fig. 7). Meshed with these teeth is a small gear wheel 143 to which is secured a larger gear 144 having twice as many teeth as the smaller gear. Meshed with the larger gear 144 is an aligning gear 145 which also meshes with the type wheel 118. The principal object of gear 145 is to hold the printing gears in their printing position until returned to normal by a retract bail. For this purpose a ratchet wheel 146 is secured to gear 145 and a pawl 147 is mounted in engaging relation as shown. After the type wheel mechanism has been positioned by the code bars 134, the pawl 147 is moved into engagement with the teeth of wheel 146 and by means of the supporting structure 148 rotating about shaft 149, the pawl is moved downwardly an amount that is slightly more than is necessary for the proper operation as a ratchet device. This extra movement is the means of accomplishing two other important effects. First, it provides a convenient and accurate method of aligning the type wheels 118, thereby counteracting any backlash or loose motion which otherwise might cause irregular printing. Second, the action lowers the rack bars 137 slightly and permits the bail rods 150 to withdraw the stop bars 134 (Fig. 6) without friction or jamming.

The type wheels 118 are formed as shown in Fig. 32 with gear teeth, the ends of which are flattened to provide a type face.

When the mechanism is about ready to print, a bail 151 carried by an arm 150A pivoted on shaft 150B which normally holds up the firing levers 152, is lowered as described hereinafter and soon after a shaft 153 is rotated, removing bail 154 from engagement with portion 155 of levers 152 and the wheels 118 are forced down on the typewriter ribbon and card by the action of springs 156.

Immediately after the printing operation, the bail 151 is raised by suitable camming action and the type wheel 118 together with the hook portion 155 is raised to the normal position. The bail 154 is lowered and the card is run by rollers 157 into the eject pocket 120 with its designations printed thereon.

Soon after the printing operation, the bail 158 is lowered and engages the decoding rack bars 137 at a shoulder 159, thereby forcing down all of said bars to their normal position. The ratchet pawl 147 is kept in operative engagement during this operation and as the bars are lowered the teeth on ratchet wheel 146 slide under the pawl until the bars have all reached their normal position. The machine is then ready for another cycle of operations.

Figure 2:
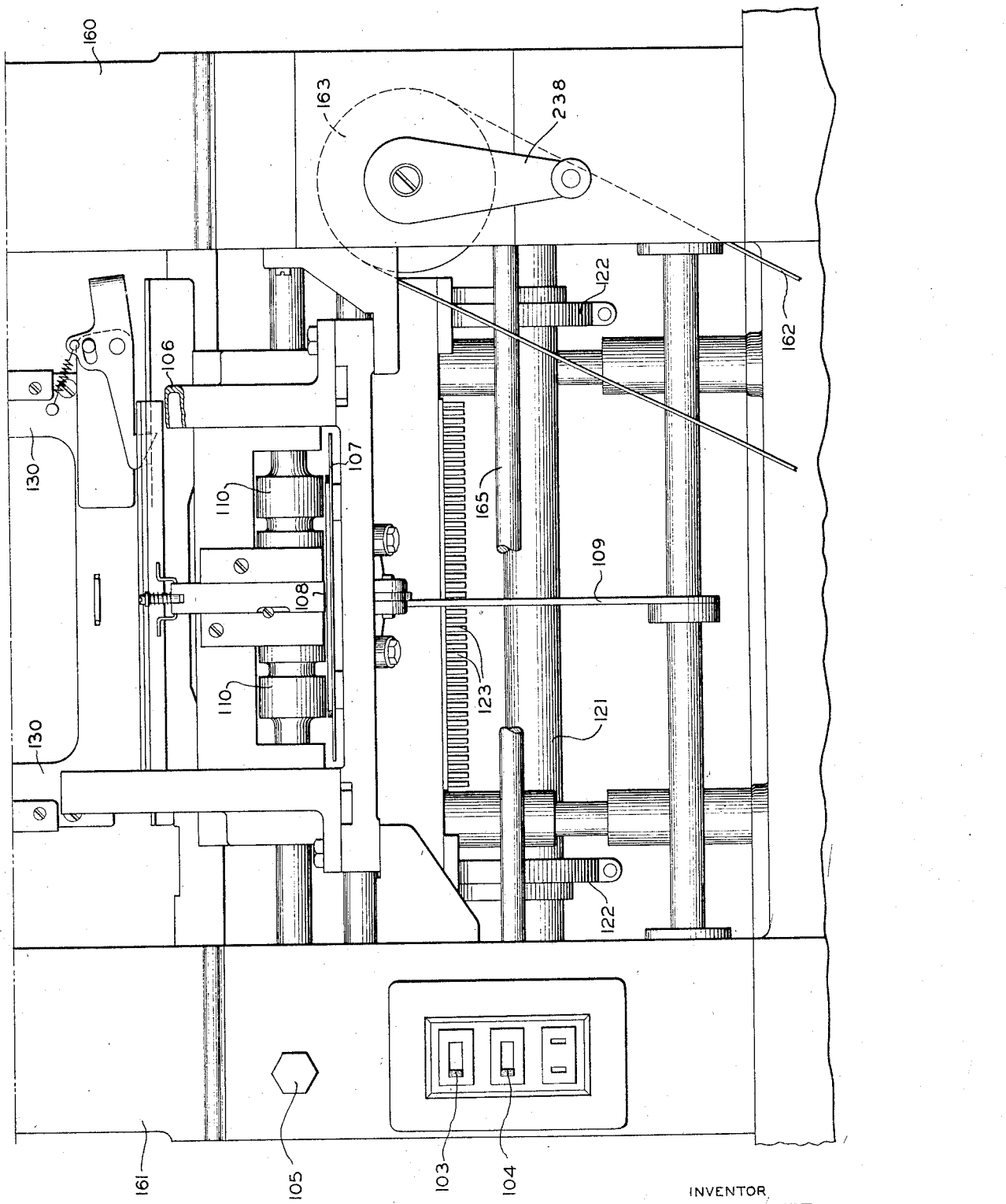
Fig. 2 is an elevational view of the front of the machine with the cover removed, showing only the base section.

As may be seen best in Fig. 4, two side frame pieces 160 and 161 are employed to enclose and support certain motivating gears and cams which drive the mechanisms positioned between said side pieces. An electric motor (not shown) drives a belt 162 (Figs. 2 and 13) which is connected with a mechanical clutch 163, controlled by an arm and pin assembly 164 which in turn is mounted on a shaft 165. Shaft 165 extends through the machine to the left-hand base section (Fig. 10) at which point a lever 166 is secured thereon and operated by a start-stop mechanism which is the same as the start-stop mechanisms on all recent Powers tabulators. This part of the machine has been fully described in U. S. Patent No. 2,044,119 issued June 16, 1936, to W. W. Lasker and therefore need not be described here.

When the clutch is thrown into engagement, it rotates a short shaft 167 (Fig. 13) to which a series of seven worm gears 168 are secured. Shaft 167 may also be rotated manually by a handle 238 (Fig. 2) (normally disengaged) for purposes of adjustment and inspection. Worm gears 168 mesh with a total of nine other worm wheels 169, 170, and 171 which rotate on axes at right angles to the shaft 167, seven of these operate card feed rollers, and the other two operate shafts to which are secured a plurality of cams.

Figure 3:
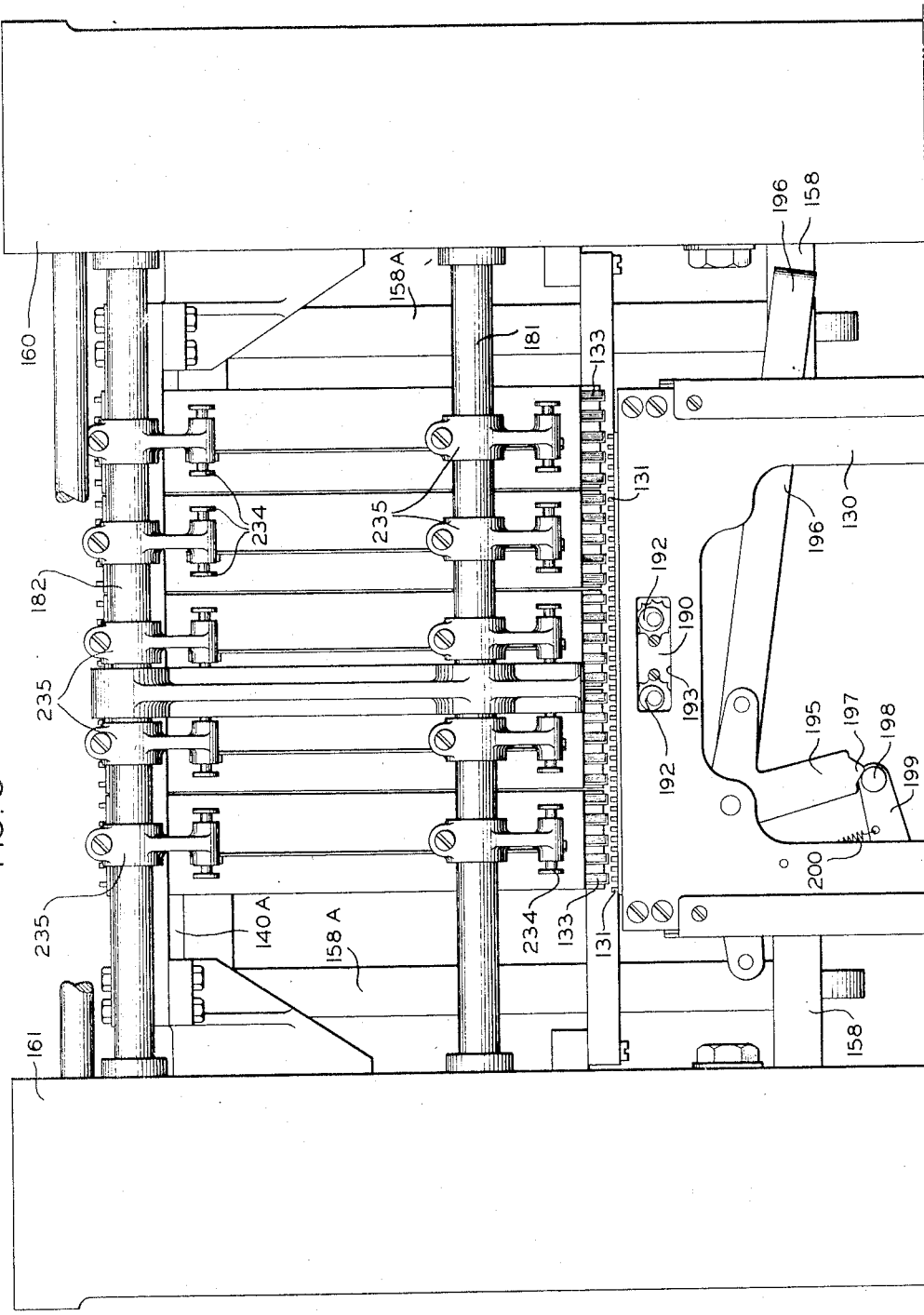
Fig. 3 is a front elevational view of the top portion of the machine showing the decoding unit and the restoring bail levers.

Worm wheel 170 is attached to a cross shaft 121 which is journalled in both end frames 160 and 161. Secured to both ends of this shaft are similar cams 173, each with its cam roller 174 and cam lever 175 (Figs. 10 and 13). Vertical rods 176 (Figs. 10, 11, 12, and 13) transmit the cam motion to a pair of bell-cranks 177 which in turn engage other reversing bell-cranks 178, links 179 and levers 180. Two springs 180A pull the ends of levers 180 downward and, through the link mechanism described, hold the cam roller 174 against cam 173. The main purpose of this mechanism is to rock shafts 181 and 182 which operate the bail mechanisms used to restore the decoding permutation stops just before the printing operation. In Figs. 3 and 6 these cross shafts are shown in greater detail.

Also mounted on shaft 121 in the central section are the two eccentrics 122 (Figs. 2 and 5) which raise the sensing head once each cycle. And mounted on shaft 121 (Fig. 10) are three operating cams which are located adjacent to cam 173 and are part of the standard base. Two of these cams cooperate with the start-stop mechanism while the third operates the card picker lever. They are all described in detail in the aforementioned Patent 2,044,119.

Worm wheel 171 near the rear of the machine (Fig. 13) meshes with one of the worm gears 168 and is secured to a cross shaft 172 which is journalled in each side frame and carries a plurality of cams for the operation of the printing mechanism. On each end of shaft 172 is secured a crank 183 which operates pitmans 184. The upper end of each pitman is pivoted to the mid-portion of a lever 185 (Figs. 10 and 13) the moving extremity of which is connected by a linkage 186 to the bail rod 158 (Fig. 11) which is mounted for vertical travel on two carriages 187 moving on rods 188. A pair of springs 189 helps support the carriage assembly and reduces the force necessary to raise the bail.

There are seven cams secured to shaft 172 located between the side pieces 160 and 161. These cams and their functions will be described hereinafter under separate headings.

Upper-lower transfer

Since it is often desirable to print only forty-five characters or less and since the mechanism may be made more flexible by such construction, only forty-five print wheels and decoding stacks are used. Hence cards must be fed through the machine twice to have the total ninety columns printed in visible characters.

A full quota of five hundred and forty sensing positions is provided in the sensing head and such sensed information is transferred to the translator Bowden wires as has already been explained.

The six wires which transmit the sensed data from the first upper column of the card are led to the left rear corner in the upper translator frame and there secured almost directly above the sensing position. Because of the staggered arrangement of the decoding assembly, the second row of the upper zone is positioned in the left front corner of the upper frame. The first column lower zone group is positioned adjacent to the first column upper zone group and the second column lower is placed beside the second column upper. This scheduled interleaving is continued until all five hundred and forty Bowden wires are secured in the upper frame of the translator with all the odd numbered rows at the rear and all the even numbered rows at the front. Also, the upper and lower rows of each card column are adjacent to each other. This latter arrangement is always necessary in order to provide the transfer from upper to lower card field, but it is obvious that the various columns may be shifted anywhere on the card area, and printing may therefore be done in a different order and position than that of punched data.

The upper frame of the translator which holds the upper ends of the Bowden wires is slidably constructed so that it may be moved transversely in the machine a distance equal to half the separation of the decoding bars. The relative positions are well illustrated in Fig. 3 where the upper ends of the Bowden wire interponents 131 are just below the lower ends of the decoding permutation bars 133. The decoding bar spacing is just twice the spacing of the Bowden wires and only half of the Bowden wire interponents 131 may engage the permutation bars 133 at one setting.

Fig. 14 illustrates the mechanism which shifts the interponents 131. A sliding frame 190 is held within the translator frame 130 by four short rocker arms 191. A pair of adjustable eccentrics 192 are mounted on the slidable frame with their eccentric portions engaging a slot 193 in the frame 130 (Fig. 3) so as to limit the frame motion. A short pin 194 is also secured to the frame 190 and a slotted bell crank 195 engages the pin and is pivotally mounted to the inner face of frame 130. A long handle 196 is removably secured to one arm of bell-crank 195 so that an operator may shift the bell-crank and frame easily. The lower arm of bell-crank 195 is extended in the form of a blunt point 197 which acts as a detent when associated with a roller 198, lever 199, and spring 200 (Fig. 14).

When the printing interpreter has been set to print all the data occurring in the upper zone of the card and all the cards have been run through, the operator then moves lever 196 to its other position and runs the cards through again. Since the second printing must be on a different part of the card from the first impression, the card stops in the printing chamber must be changed simultaneously with the Bowden wire shift. This change is accomplished by the following mechanism. An additional arm 201 is welded to bell-crank 195 and a pin 202, secured to its outer end, engages a slot 203 in a vertically movable member 204. This member has a bent-over portion 205 at its lower end to which is pivotally attached one end of a lever 206 (Figs. 10, 14, 26, and 27). The lever 206 is rotatably mounted on a common sleeve 207 in which are mounted numerous other levers and operating members associated with the start-stop mechanism. A lever 206A is also secured to this sleeve and its lower end is pivoted to a long link 208 by a pin, slot, and spring connection. The other end of link 208 is pivotally attached to a crank arm 209 which is secured to a shaft 210. The shaft 210 is journaled in both side frames 160 and 161 extending across the machine and has secured thereon, near its middle portion, two crank arms 211 (Figs. 7 and 28) which operate the mechanism that selects the required card stops.

The shift from upper to lower is made by a lever which has a long power arm and a short operating arm, therefore, there is considerable force exerted at the shiftable translator frame to move the Bowden wire interponents the required amount. If the machine were stopped at a half cycle point when some of the sensing pins were elevated and an attempt were made to shift from one zone to another, the elevated pins would either be sheared off or badly bent. To overcome this disadvantage, a locking mechanism is incorporated in the machine to prevent zone shifting at any time except at the end of a machine cycle. The vertical plate 204 is equipped with a lug 212 (Figs. 10, 14, and 27) which is engaged by a hook member 213 when the machine is running or shifted from its normal stopping position. The hook member 213 is attached to a shaft 214 to which is secured a horizontal arm 215 with a pin 216 attached to its extremity. The pin 216 rests on a notched lever 217, the position of which is controlled by a no-card pin 217A (Fig. 14) and a series of linkages working in conjunction with the standard start-stop mechanism found on all Powers tabulators. A full and complete description of the start-stop tabulator mechanism will be found in the above mentioned Patent 2,044,119 and also in Patent 2,151,177 issued to S. Alvine, March 21, 1939. Fig. 27 shows the parts in greater detail with the lever 217 in the normal stopping position. When the machine is running, a vertical rod 218 rises and falls once each cycle due to the action of cam 219 keyed to shaft 121. As long as the lever 217 is held over to the right by one of the controls for stopping the machine the top of rod 218 will rise into the cut out portion of lever 217 and no further action will occur. When the cards are all run through the machine, or one of the stopping controls actuated, the lever 217 is pushed toward the rear of the machine (to the left in Fig. 27) and when cam 219 again raises bar 218, it will lift the lever 217 and, by a train of mechanism (not shown) will rock shaft 165, whereby the clutch 163 is released and the machine is stopped. The raising of lever 217 also rocks levers 215 and 213, counter-clockwise (Fig. 27) thereby removing the hook portion of 213 from engagement with lug 212 on member 204 and allowing the zonal shift by hand lever 196. The position of cam 219 is such that when it raises rod 218, there are no sensing pins raised, no translator actuation and therefore a zonal shift may be made without any mechanical injury. If, for any reason, the machine were stopped at any other point in the machine cycle, the bar 218 would not be raised, lever 217 would remain horizontal and the hook member 213 would engage the lug 212, on its upper or lower edge, and prevent a zonal shift of the translator.

The base plate of printing chamber 114 (Fig. 7) is provided with a plurality of slots 116A through which card stops 116 and 117 may be elevated to engage the front edge of the data card and position it for subsequent printing. While there are seven slots, giving seven printing positions, only two of these are used for any machine setting and to change to any other two requires the removal of a machine element and the substitution of another.

A detailed view of the card stops is shown in Fig. 28. The upper portion of the stops slide vertically in slots 116A cut in the printing platen 123 (Fig. 7). The lower extremities of stops 116 and 117 are formed with square rods 220 which slide in holes cut in a bottom guide plate 221. Helical springs 222 positioned on the rods 220 urge the stops upwardly into engaging position but an oblong hole 223 cut in the central portion of the stops serves as a means for limiting and operating them against the springs 222.

There is a flat link 224 positioned in each group of stops which slides in slots cut in two brackets 225 and is controlled by a pin and slot connection 228 with arm 211. A notch 226 is formed in the lower edge of rod 224 so that when the lever 211 is moved toward the front of the machine, the slot 226 will be directly above the card stop 116. A lever 229 is also positioned in the holes 223 and when lever 229 is rocked counter-clockwise (Fig. 7) said stop will be elevated to a position where it will engage the card. When crank 211 is moved toward the rear of the machine bar 224 will hold stop 116 and notch 227 will lie above card stop 117, allowing it to be elevated by lever 229.

The raising and lowering of the card stops is controlled by the lever 229 (Fig. 7) which is secured to a shaft 230 which is journalled in the side frames 160 and 161 and carries an arm 231 with a cam follower 232 on its lower extremity which rides on the surface of cam 233 secured to shaft 172.

*Code interpretation*

The interpretation of the code from the sensing head to a mechanical displacement which may be used by the printing mechanism is accomplished by the decoding mechanism shown in Fig. 6 and fully disclosed and described in the application of John Mueller, S. N. 174,354 filed November 13, 1937. The coded information is received from the translator interponents 131 by the permutation bars 133 and as soon as these bars have been moved the required distance, the retract bails 150 are released by links 234 which in turn are actuated by crank arms 235 secured to shafts 181 and 182.

Then one and sometimes two stop bars 134 or 138 travel to the rear of the machine (right in Fig. 6) and provide a limit stop for the rack bar 137 which controls the printing wheel. As soon as the rack bar has been positioned, it is lowered slightly and held by a ratchet pawl 147 in the printing mechanism (Fig. 7) and the retract bail 150 moves forward and restores the code bars to their normal position.

The permutation bars 133 are shown in detail in Figs. 6 and 16. The code is worked out in the configurations of the left-hand edges of the openings 236. In order to provide ample room for movements of comfortable length, said openings are staggered in two rows in each bar. The pin 237 of the uppermost stop bar 134 in Fig. 6 passes through the topmost openings 236 in the front row, right hand Fig. 6, left hand Fig. 16, and the pin 237 of the second bar enters the openings in the rear row; and so on down the series.

It will be noted that the openings are of several shapes, four varieties being used. The one in bar E marked 236A in Fig. 16 is adapted to lock the pin 237 and, therefore, its corresponding stop in retracted position, unless said bar E is raised. If said bar is raised this stop will be permitted to move its full distance to cooperate with the upper shoulder 136 of the differential bar 137, providing bar D is elevated at the same time. The opening in bar A lettered 236B, has the opposite effect and it will be noticed that this opening does not prevent movement of the pin 237 unless bar A is raised, in which latter event the stop is locked. The opening in permutation bar F marked 236C does not prevent the stop from moving its full distance if the permutation bar F is not raised, but, if said bar is raised, it will limit the movement of the stop bar to a half movement, causing it to cooperate with the shoulder 135 and, therefore, allow the rack bar 137 to advance one type space higher.

The construction is such that the lowermost stop bar 134 cannot advance at all unless bar A is raised. Even if bar A is raised, the stop will not advance if permutation bar B is also raised or any other permutation bar (D, E or F) having an opening like 236B. If permutation bar A is raised alone, the stop will advance its full distance and arrest the bar 137 at surface 136. If both A and C are raised and no other permutation bar, the stop will advance a half step and the rack bar 137 will be arrested at shoulder 135. The square opening 236D allows the associated stop bar 134 freedom to advance whether the permutation bar C rises or not. It will be convenient to refer to holes like 236B as full-step holes, 236A as locking holes, 236C as half-step holes, and 236D as indifferent holes.

A six-point code, using 1, 2, and 3 points at a time, has forty-one possible combinations, viz., six one-point, fifteen two-point, and twenty three-point combinations. In the machine illustrated, the combinations AB, ABC, ABD, ABE, and ABF are reserved for special uses, leaving for the ten numeral and twenty-six alphabet characters, six one-point, fourteen two-point and sixteen three-point combinations. In all punch card accounting, numerals are used so much more than letters that it is desirable to represent them by one and two-point combinations. For obvious mechanical reasons, the first ten stop bars 134, counting from the bottom, are used to determine numerical movements of the rack bars 137, said stops on a short advance also determining ten letters interspaced with the numerals. In general, the upper stop bars 134 are controlled by three-point combinations and the lower ones mainly by the simpler combinations. In Fig. 16 the code adopted is given at the left. The code is extended at the top by dotted lines to include the five omitted combinations, in case it be desired to use them. The stop bars 134 and 138 are indicated as dot-dash lines, the pins 237 being repeated in all six of the permutation bars 133. The bars are distinguished by letters A, B, C, D, E, and F.

Each stop bar 134 is controlled by two combinations and in each instance the two combinations have one or two points in common; and it will be convenient to refer to this common element as the "root" of the pair of combinations. Thus, the first stop is controlled by combinations of A and AC, of which A is the root, and the eighteenth stop is controlled by CDE and DEF, of which DE is the root.

The openings 236 for the first stop are a full-step in permutation bar A, a half step in bar C and locking openings in B, D, E and F. Therefore, this stop can be released only by raising bar A. If A is raised alone stop 134 will advance a full step, the rack bar 137 will be in its lowest position, and the zero will be at the printing point. If A and C are both raised, the stop will advance a half step due to pin 237 encountering an opening 236C; the rack bar 137 will rise one type-space and type "E" will be rotated into printing position on the type wheel. If any other permutation bar 133 is raised, the first stop bar will be locked. The same description applies to stop bars 2, 4, 6, 8 and 10 except that different permutation bars are used. The third stop bar 134 is controlled by combinations BF and BDF. Here BF is the root, and each of those bars 133 has a full-step opening 236B at this level and bar D a half-step opening 236C, all other bars having locking openings. Both bars B and F must be raised in order to release this stop, which will make a full step if they are raised alone and a half-step if D is also raised. If any other bar 133 is also raised, this stop is locked. A similar description applies also to stops 134 numbered 3, 5, 7, 9, 11, and 12. Each of these first twelve stops is released for a full step by its root combination and limited to a half step by its root combination plus one other bar 133; and each of them is locked by raising any bar 133 not included in its combinations.

The first twelve stops 134 exhaust all of the one-point combinations, all but two of the two-point combinations, and five of the three point combinations. Because of the five combinations arbitrarily reserved, and because of preserving the Powers numerical code, the combinations remaining are such that the two two-point combinations cannot each be used as a root to produce one of the three-point combinations. Each of the remaining six stops, therefore, must be controlled by two combinations having the same number of points, and this introduces a problem, the solution of which includes the indifferent openings 236D, of which one is used for each of these six stops. Even if the two-point combinations could have been used as roots, there would still have remained four stops to be controlled each by two three-point combinations.

The thirteenth stop 134 is controlled by combinations ADE and BDE, of which DE is the root. Bars D and E have full-step openings on this level, bar B a half-step opening, and bar A an indifferent opening. If D and E only are raised, the stop will be released, whether for a full step or a half step is immaterial because this same combination also releases the sixth stop (for a half step), and the bar 137 will, therefore, be arrested by that stop and thereby setting the print wheel in position for printing the letter "G." If, however, bars A, D, and E are all raised, bar A will lock the sixth stop with a 236B opening and the thirteenth stop will make a full step to cause a "U" to be positioned on the print wheel. If bars B, D, and E be raised, B will lock the sixth stop and limit the thirteenth step to a half step to cause an "S" to be positioned on the printing wheel. The indifferent opening in A must be such that the stop can advance at least a half-step when A is not raised, and such that said step can advance a full step when A is raised with D and E. A similar description applies to each of these uppermost six stops. Each indifferent opening allows the associated stop to advance at the same time as some other stop below it, when the root-combination alone is used; but, when the bar containing the indifferent opening is also raised, it locks out the lower stop and makes the upper one effective.

It may be remarked that the uppermost stop 134 does not absolutely require any locking openings because the machine would function if this stop were released by each and every combination. In a similar way, many of the locking openings are not absolutely essential. It is, however, preferable to prevent unnecessary movement of these stops.

The five combinations shown in dotted lines at the upper left in Fig. 16 can readily be worked out in the permutation bars 133 on the same system as above described, if it is desired to use them for printing purposes. In other words, this system is capable of utilizing all forty-one of the possible combinations. In Fig. 15 an item card 142 is shown with the above described code punched in columns 1–36 and in columns 39–43, the extension to include the five combinations not employed for characters in the present machine.

The zero stop bar 138, in each denomination, is controlled by like openings 236E in all of the permutation bars 133, said opening so shaped as to lock the stop when any bar is raised, the stop when released, engages tooth 139 on member 137 to hold the rack bar in zero position. This stop therefore will prevent rising of its rack bar if the corresponding column of the card is blank; and these stops will hold down all of the associated type bars if the machine is operated with a blank card in the sensing chamber.

It is believed that the above described stop and code mechanism is in several respects novel and advantageous. By using each of the stops for two positions, the stops are made of sturdy dimensions and without crowding; and by using each stop for only two positions, their advance movements are short enough to be easily effected without being divided into such fine gradations as to require great precision and as to introduce likelihood of erroneous operation. The permutation bars have each only one extent of movement to active position, which, therefore, it was possible to make long enough to eliminate the necessity of great precision in the translator by which they are operated. The control of these permutation bars over the stops is direct, simple, and positive.

*Printing mechanism*

The main operating features of the printing mechanism have already been described so this section will take up the detailed description and the various locking and protecting features which have been built into the printing system.

The rack bail 158 (Figs. 7, 8, and 9) is moved up and down by a crank mechanism 183, 184, 185 and 186 on the side frames which has already been described. The timing of the machine is such that the stop bars 134 are in position before the bail 158 rises, hence the various racks 137 which are released will travel upward under the influence of springs 140, limited by the bail 158 and stopped in printing position by the stop bars 134. When the bail has reached its topmost point, it starts down at once due to the crank driving force, but the parts are so proportioned as to effect a definite overthrow of about 20° or an additional movement above the upper stop bar position (see Figs. 29 and 30). When the bail has reached this point the ratchet pawl 147 is moved into engaging position and the printing is effected by cam actions to be described later. As the bail 158 descends it collects the operated rack bars and pulls them down to the position of Fig. 7 at the end of the cycle. At the beginning of the next cycle the racks are restored to their lowest position. While the bail is returning the racks, the ratchet pawl 147 is left in engaging position, hence as each rack is engaged and lowered the pawl slides over the teeth on wheel 146 until all the racks have been normalized. In this manner the printing racks and type wheels are moved into position and normalized again without any severe shocks to any part of the system.

At all times, except during the actual printing operation, the type wheels 118 are held in resilient mesh with gears 145 by a plurality of springs 239. These springs are stretched between extensions of the firing levers 152 and arms 240 which carry the type wheels 118. Both the levers 152 and the arms 240 are rotatably mounted on a cross shaft 241 which is secured to side plates 242. In each type wheel arm 240 a pin 243 is secured which moves in a slot 244 cut in bell crank 152. Except when printing, the pin is not in contact with the upper end of the slot but just prior to the printing operation the bail 151 (Figs. 7, 8, and 9) is lowered by a cam follower arm 245 controlled by cam 246 secured to shaft 172. This action causes the top of slot 244 to engage the pin 243 and at the same time the hook portion 155 rests against the bail 154. Immediately thereafter, the bail 154 is raised by a cam 247 (Figs. 9 and 24) acting through a follower 248 and a bar 249 which turns a lever 250 secured to shaft 153. When the bail 154 clears the hook portion 155, the type wheel will be forced down on the ribbon and card by spring 156 and print the character thereon. The duration of printing contact is very short, about 5°, as may be seen by referring to the timing chart in Fig. 30. Cam 246 again raises the bail 151, raising the type wheel by means of spring 239 and rotating bell crank 152 clockwise high enough so that the bail 154 may be dropped below the hook 155 without touching it.

At the rear of the machine a plurality of stop pins 251 are held in a framework 252 in staggered relation across the rear of the machine. For uniformity in manufacture, the bell cranks 152 are formed with two projections 253. However, only one of these is used on each bell crank, the alternate arms using the top projection for disabling engagement with an upper stop pin 251 and the remainder using their lower projection for engagement with a lower stop pin. Reference to Fig. 7 discloses that the mechanism of the firing bail 154 and the restoring bail 151 will not be interfered with by operating the stop pins 251. The type wheels 118 are held in mesh with intermediate gear 145 by the spring 239 and are not free to leave that position as long as the stop pins 251 are engaging the projections 253.

Every data card has a number of blank columns wherein no punched data has been recorded. Even in a card filled with data there will always be spaces between words and figures. There are no blank teeth on the printing wheel 118, hence when a blank column is sensed in the card and no movement of the wheel results, a lock must be provided to disable the wheels, otherwise a "Z" will be printed. These locks are simple levers 254 (Fig. 7) pivoted on a cross shaft 256 and urged clockwise by a spring 255. The lower end of the locking lever has a short pin 257 riveted thereon which engages the bottom edge of the rack bar 137 and is positioned by it when the rack bar is in its blank or unmoved position. The top end of locking lever 254 engages a pin 258 on printing arm 240 when in its locking position. Fig. 7 shows the lever 254 holding the arm 240 in disabled condition and no printing is possible under these conditions. When, however, the rack bar 137 is moved upward a single space or more, the lever 254 will rock in a clockwise direction and be disengaged from pin 258. Printing may then be carried out in the usual manner. When the rack bars 137 are again returned to normal by their bail 158, the locking levers 254 are again engaged and rocked to their locking position.

The most convenient and usual place to print the data characters for the upper zone is on the upper part of the card, close to the top edge (see Fig. 15). This presents a serious difficulty because the type wheel 118 is liable to strike card stop 117 during the printing operation and injure the type. Accordingly the card stop cam 233 is formed so as to lower the card stops at about 5° before the printing operation and a mechanical clamping device, called a pressure pad, is used to hold the card in place while the printing is effected. Two cams 259 and 260, shown in detail in Figs. 22 and 23, are used to operate the pressure pad at about 234° of the machine cycle and hold the card until about 262° or until after printing is finished, as indicated in the timing diagram, Figs. 29 and 30. These cams 259 and 260 are secured to shaft 172 one on each side of the machine, and elevate vertical bars 261 and 262, each of which is equipped with a cam roller. The vertical bars actuate two U-shaped levers 263 and 264 pivoted at one end thereof and formed with bent over portions 265 and 266 (see also Figs. 8 and 31). The levers 263 and 264 are pivoted to the frame at 266A.

The actual clamping of the card is done by a flat plate 321 which extends across the printing chamber and is secured at either end to the bent over portions 265 and 266. Three bolts at each end provide an adjusting means for positioning the plate 321 the correct distance above the base plate 323 to allow the card easy entrance and exit but at the same time providing secure clamping action.

The plate 321 may be left flat and designed to grip the card over its entire cooperating area. It has been found, however, that the addition of two thin plates 324 on the bottom of plate 321 gives a more secure clamping action, less likely to slip.

The typewriter ribbon 119 is threaded in slots in horizontal members 329 attached to a plate 325 (Fig. 7) which is mounted on the swinging printer section, and since a clearer printed character results when the ribbon is close to the card, the plate 325 with its ribbon holder is lowered each time the pressure pad 321 is lowered. The proper clearance distance is secured by two lugs 326 (Figs. 22 and 23) which are positioned by the turned over portions 266 and 265. The plate 325 is urged downward by two springs 327 enclosed in brackets 328 secured to the side frames of the printing section.

The pressure pad 321 is lowered only for a short time during each cycle as may be seen by reference to Figs. 29 and 30. The card is clamped at about 234°. The card stop is lowered to card clearing position at about 240°. Printing occurs at 245° and the card is released by the pressure pad at 262°. As soon as the card is free to move it is fed into the eject basket 120 by the card rollers 157.

The ratchet pawl 147, of which there is one for each type wheel, (Figs. 7, 8, and 25) is engaged and disengaged by cams 267 which operate the pawls through a series of linkages, one on each side of the machine. A cam follower 268, associated with each cam is mounted on a lever 269 and actuates a vertical rod 270 which in turn is pivotally attached to a rockable plate 271. The plate is mounted on a short stub shaft 272 on which it rocks, and at its lower extremity is a turned over portion 273.

Mounted in journals (Fig. 4) on the subframe 242 of the printing mechanism is a cross shaft 149 which is in alignment with the two stub shafts 272. Secured to the ends of shaft 149 are two pointed arms 274 (Figs. 6, 9, and 25). These arms are positioned on the shaft 149 in such manner as to engage the lower surface of the bent over portions 273 of arms 271 on shafts 272. Also secured to shaft 149 is a channel 148 (Fig. 7) having forty-five slots cut therein each holding a pawl 147. The pawls have individual springs 275 to hold them in engagement with ratchet wheel 146 while two springs 276, one at each end of the channel, tend to rotate the shaft 149 clockwise as seen in Fig. 7, and keep the arms 274 in contact with portions 273.

When the ratchet pawls are to be brought into engagement with their respective wheels, cam 267 lowers arm 269 and thereby rotates plate 271 and arm 274 which are concentrically mounted. The result is the rotation of shaft 149 and the lowering of the pawls to a position where they make operative engagement with ratchet wheel 146. When the pawls are to be withdrawn the above mentioned linkages are reversed, and the pawls 147 pulled upwardly until a stationary cross bar 277 lifts them clear of the teeth.

The rockable plate 271 and the cooperating arm 274, each on its own shaft would be an unnecessary structure were it not for the fact that the entire printing mechanism is made available for inspection and adjustment by rotatably mounting the printing frame plates 242 on cross shaft 278. The gear wheels 143 and 144 which communicate the decoded data to the print wheels are pivotally mounted on this shaft, so turning the mechanism about this point will not disengage any of the gear train.

There are three cams on shaft 172 below the printing mechanism (Figs. 7, 21, 24, and 25) which are required to communicate their cam actions to some part of the printing structure. One of these, cam 267 (Fig. 25) has just been described. The other two are cams 246 and 247 which operate the bail 151 and the firing bail shaft 153. These two cam mechanisms are similar in that both act through vertical rods 270 and 249 and both operate parts of the print firing and resetting mechanisms. Both actions are made adjustable by nut and bolt structures and both rods are made in two sections so that the printing section may be rotatably removed from the cam actuators without removing any connections. As indicated in Fig. 21 the lever 151A has a bent over portion forming a face 281 which rests on the rod 270 and is removed therefrom when the printing section is raised. Fig. 24 indicates a break 280 in the two sections of rod 249 for the same reason. When the printing mechanism is returned to operating position the rods seat in their correct position without further attention due to the weight of the attached levers and arms.

To raise the printing mechanism, a bail bar 282 is rocked clockwise (Fig. 9) about shaft 289 and then lifted. The bail 282 (Figs. 8 and 9) is mounted on two levers 283 which are secured to a cross shaft 289 journaled in the side frames 242 of the printing section. Two links 284 are pivotally attached to the levers 283 and transfer the action of the bail to a pair of hook pawls 285 which are secured to a bar 285A journaled in frames 242. The pawls 285 engage two serrated segments 286 secured to frames 160 and 161, and are adapted to hold the printing mechanism in a number of raised positions for the purpose of changing ribbons and cleaning type.

When the printing mechanism is returned to its normal working position and the bail 282 drawn counter-clockwise, the mechanism is locked against counter-clockwise rotation by a pair of latch plates 287 attached to the side frames 160 and 161 of the machine with which a pair of latch arms 288, secured to the cross shaft 289, cooperate. A small spring 283A stretched between studs on the lever 283 and latch plate 287 urges the pawls 285 and the latch arms 288 into engaging position.

A modified form of printing mechanism is shown in Fig. 33. It will be noted that the ratchet 146 and the pawl 147 have been omitted in this view. Also that the arms 240 which carry the printing wheels have been changed as to form. They are now notched to rest on shaft 241 thereby permitting their easy removal to permit replacement and repair. The arm 240 has formed thereon an extension 335 which is connected by a spring 336 to the firing lever 152 and tends to hold the wheel 118 in mesh with the gear 145. The levers 152 in this modified form have an arm 337 formed thereon, the upper end of which is formed to fit between the teeth of a type wheel 118. The spring 156 is a great deal stronger than spring 336.

When the bail 151 is lowered, as described above, the selected wheels 118 are prepared for printing and when bail 154 is raised out of the path of the arm 155 on firing lever 152, the nose of arm 337 is interposed between the teeth of wheel 118 centering the type and holding the wheel from rotation. This action is caused by the spring 336. The complete depression of the type wheel is caused by the spring 156 which rocks firing lever 152, thereby depressing the type wheel through the medium of arm 337.

A new means of elevating the printing mechanism has also been provided in this modified form. The bail 282, lever 283, pawl 285, and serrated segments have been replaced by a toggle device which not only permits easy raising of the print mechanism but prevents the print wheels from coming out of mesh with wheel 145. The toggle device, of which there are two, comprises an arm 340 rotatably mounted on a shaft 341 at each side of the machine and an arm 342 pivoted on the cross shaft 289 journaled in the side plates 242 of the printing mechanism. The arms 340 and 342 are secured together on a shaft 343 which is eccentrically mounted. The arm 340 is formed with an extension in which is secured each end of a bail bar 344 which forms a handle for raising the printer. Pivoted on the bail 344 are links 345 which carry at their lower end a bail bar 346 which moves in a slot 347 cut in arm 342. The slot 347 has a cutout portion 348 in the top thereof. A spring 356, anchored on shaft 341 alongside of the toggle and secured to cross shaft 289, is provided to assist in raising the printing mechanism. It is not strong enough to raise the mechanism, but aids in raising it.

When the bail bar 344 is drawn to the right (Fig. 33) the bars 340 and 342 rotate about bar 341 and shaft 289, thus raising the printer to a position wherein the print wheels, etc., may be reached. As the arms 340 and 342 rotate, the bail 346 rises in the slot 347 until it snaps into the cutout 348. The cutout engaging the bail 346 holds the printer in elevated position.

A means is provided for maintaining the print wheels 118 in mesh with gears 145 when the printer is elevated. This means comprises a cam plate 350 secured to the arm 342 upon which acts a follower roller in a bell-crank 351 pivoted on a stud 352 in the side frame 242. Secured to the other end of bell-crank 351 is a link 353, the free end of which has an elongated slot 354 formed therein. The bail 151 hereinbefore described is positioned in this slot and is free to move therein when the printer is in its lowered position.

When the arm 342 is rotated by the breaking of toggle 340–342, the cam 350 rocks bell-crank 351 clockwise, elevating the link 353, thereby raising the bail 151 irrespective of what position it is in. The raising of bail 151 holds firing levers 152 elevated and spring 336 holds the arms 240 rocked clockwise, thus maintaining the wheels 118 and gears 145 in mesh.

Ribbon mechanism

The ink impregnated ribbon used for printing is identical with that used in typewriters and the mechanism used for reeling from one spool to the other is similar in every way to the typewriter mechanism. Each printing actuation may print forty-five type characters and in order to insure a ribbon movement that will provide a reasonably fresh inked surface for each type wheel, the ribbon is set on a diagonal mounting. After each impression, the ribbon is moved one type space by turning the winding spool a predetermined amount, such movement resulting in a transverse as well as longitudinal shift of printing position due to the diagonal mounting.

Two ribbon spools 290 and 291 are journaled in suitable brackets attached to the side frames 242 of the printing mechanism. To spools 290 and 291 are attached ratchet wheels 292 and 293 respectively (Figs. 4, 18, and 20) each of which is operated by a pawl 294 whereby the ribbon is reeled from one spool to the other. Figs. 17 and 18 show the reeling mechanism in disabled condition allowing the ribbon to be unwound while Figs. 19 and 20 show the reeling mechanism in operative condition adapted to wind up the ribbon.

The impulse necessary to actuate the reeling mechanism is derived from a hook member 295 (Figs. 8, 9, and 4) attached to the bail bar 158 which moves down once each printing cycle. The hook member 295 engages a cylindrical lug 296 secured to a bell-crank 297 which operates a horizontal bar 298. This horizontal bar is attached to the operating mechanism of the ribbon reels as may be seen in Figs. 18 and 20. A movement of this bar, to the right in these figures, moves an actuating member 299 toward the rear of the machine. The actuating member 299 is a flat slide plate adapted to slide horizontally on the ribbon bracket and has rotatably mounted thereon the ratchet pawl 294.

Ratchet pawl 294 is sprung upward by a spring 300 and a front extension of the pawl 301 is connected by a link to a triangular detent 302 which is mounted on a stud shaft 305 and is positioned by a lever 303, rotatably mounted on an extension of the ribbon shaft 304.

Also mounted on shaft 305 is a cooperating pawl 306 to hold the ratchet wheel 292 in its advanced position after having been rotated by pawl 294.

As long as lever 303 is in the position indicated by Fig. 20, both pawls 306 and 294 are resiliently held against the teeth of wheel 292 by spring 300 and therefore a reciprocating motion of plate 299 will progressively turn the spool 290 and wind up the ribbon by small increments.

If, however, the lever 303 is in the position indicated by Fig. 18, the left-hand end of said lever is engaged by a notch in the detent plate 302 thereby causing the plate to be rotated clockwise through a small angle and, by means of a pin and slot connection 307, rotating pawl 294 out of engagement with the teeth on wheel 293.

In order to insure that one mechanism is free to unwind while the other is winding in the ribbon, a long lever 308 is pivoted midway between the mechanisms with each extremity engaging the rearward end of lever 303. When one lever 303 is in its disengaged position, the other lever must be in its engaged position. A handle 309 is placed on lever 308 above its pivot to facilitate manual change of direction of ribbon movement.

When one ribbon spool is about unwound an automatic change-over mechanism is provided so that the ribbon will change direction and be rewound without manual actuation. This is accomplished by providing two feeler arms 310 and 311 (Figs. 17 and 19) which sense the amount of ribbon on each spool. The feeler arms are pivoted on short shafts 312 and are each formed integral with arms 313 and 314, respectively. As the ribbon is unwound from its spool, the feeler arm 311 (Fig. 19) follows the decreasing diameter under the urging of spring 315, and the arm 314 simultaneously moves in toward the shaft 304. When the spool is almost empty, the arm 314 is in far enough to engage a bent over portion of one end of a bell-crank 316 which is pivoted on a stub shaft 317 attached to the lever arm 303. Fig. 20 illustrates the position of the parts as a ribbon winding change is being made. As the bar 298 moves horizontally with each cycle of the machine, a plate 318 is rocked about its pivot 317 due to a pin 319 sliding in a slot 320. Under normal conditions the plate 318 and the bell-crank 316 will both rock about pivot 317, causing no subsequent action, but when the point of lever 314 engages the end of the bell-crank 316, the rocking motion is arrested and the pivot 317 together with the lever 303 is forced upwardly to the engaging position.

When one spool mechanism is engaged, the other mechanism is placed in disengaging or unwinding condition due to the coupling lever 308. The direction of the ribbon will therefore be reversed and it will wind on spool 290 until spool 291 is reduced in size sufficiently to cause another reversal of the above described action.

Referring now to Figs. 29 and 30, the sensing, decoding, and printing actions will be considered with special reference to their timed relations.

The card is not rolled into the sensing chamber until the second half of the cycle. The sensing card stop (moving down) effectively closes at 200°, the card is positioned at about 220° and the sensing pins enter the card at 240°. The interponents 128, 129 and 132 contact the permutation bars 133 at 300° and lift them to their operative position at 360°. At 335° the old set-up of stop bars (if there was such a set-up) is retracted to normal position by bail 150 and the previously used permutation bars which are not actuated by the new sensed data are allowed to fall back to normal position. Since the old set-up is retracted after the new set-up has been started, some of the permutation bars, common to both set-ups, will not be normalized.

The new permutation and stop-bar set-up is retained in the decoding head from 360° or 0° to 335° or about 95% of the cycle in order to have sufficient time to position the printing racks and make printing contact.

The card is released from the sensing chamber at 125° of the second machine cycle and is rolled at once into the printing platen where the card stops (moving up) have been positioned at 165°. While the card is being positioned the printing racks 137 have been slowly moved up to their position by bail 158. Because the racks are relatively heavy and rotate several gears, almost a half cycle (160°) is consumed in elevating them to their printing position. The bail 158 is given an overthrow which consumes 40° and during this time the printing takes place. The lifting action of the retaining pawl 141 and the subsequent printing operation have already been described. After the printing operation the racks 137 are returned toward their lowest position which they will not reach until 65° in the third cycle. The pressure pad is raised at 262° (second cycle) and the card is ejected just before the end of the second machine cycle.

It will be seen from the above description and the timing charts that two cycles are necessary to print a card but since one card is sensed at the same time another card is being printed, a printed card is delivered to the eject basket for each machine cycle.

Certain matter relating to the control of the card stops and the simultaneous shifting of the translator basket has been divided out and has been described and claimed in a divisional application, S. N. 458,762, filed September 18, 1942.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In an interpreting machine, the combination of a record sensing mechanism, a decoding mechanism, a printing mechanism, a connecting means for connecting the record sensing means and the decoding means, a card printing chamber for printing a punched data card with the data sensed from the card, a plurality of stops in the printing chamber for positioning the card for printing, selection means for printing one area of the card with one half the sensed data or printing another area of the card with another half of the sensed data, said selection means comprising a mechanical shifting mechanism adapted to shift the upper portion of the connecting means so as to disable one half of said connecting means and move into engaging relation a second half of said connecting means, said shifting mechanism also comprising a means for changing stops in the card printing chamber whereby one half of the sensed data is printed in one card area and the other half of said data is printed in another card area.

2. In an interpreting machine, a printing mechanism comprising type wheels, a bail for lowering said wheels preparatory to printing, a cam operated latch for releasing said print wheels to print under spring tension, a toggle connecting said printing mechanism with the frame of said machine, said toggle when broken being adapted to elevate said printing mechanism, and means actuated by said toggle adapted to control said bail to prevent the lowering of said wheels when said printing mechanism is elevated.

3. In an interpreting machine, a printing mechanism comprising a plurality of type wheels, a plurality of drive gears for said type wheels, individual springs for urging said wheels into engagement with said gears, a platen, individual springs for urging said type wheels into printing engagement with said platen, a bail adapted to relieve the tension of said first mentioned springs, a second bail for preventing the action of said type wheels under urge of said second mentioned springs, and means for actuating said second mentioned bail to permit printing by said type wheels.

4. In an interpreting machine, the combination of a record sensing mechanism for sensing punched data cards, a plurality of permutation bar mechanisms for decoding the reading taken by said sensing mechanism, a plurality of stops which are controlled and set by the permutation bar mechanisms, a plurality of racks adapted to be resiliently positioned against said stops, a plurality of type wheels controlled by said racks, means including a driving gear for transmitting movement from said racks to said type wheels, spring operated means for impressing said type wheel on the sensed data card, and aligning means for positioning the type and disengaging the racks from said stops, said means comprising a ratchet wheel secured to said driving gear and a power driven pawl adapted to engage said ratchet and move the type wheel and rack in a restoring direction.

5. In an interpreting machine, the combination of a record sensing mechanism for sensing punched data cards, a plurality of permutation bar mechanisms for decoding the reading taken by said sensing mechanism, a plurality of stops which are controlled and set by the permutation bar mechanisms, a plurality of racks adapted to be resiliently positioned against said stops, a plurality of type wheels controlled by said racks, means for impressing said type wheels on the sensed data card, and aligning and disengaging means for positioning said type wheels, said means comprising a ratchet wheel for each of said type wheels and movable therewith and a power driven pawl adapted to engage and move each of said ratchet wheels in a restoring direction whereby said racks are disengaged from the stops before a printing operation.

ROBERT W. RITZERT.